US00RE48360E

(19) United States
(12) Reissued Patent
Kwon et al.

(10) Patent Number: US RE48,360 E
(45) Date of Reissued Patent: Dec. 15, 2020

(54) METHOD AND APPARATUS FOR PROVIDING TRICK PLAY SERVICE

(71) Applicant: SAMSUNG ELECTRONICS CO., LTD., Suwon-si (KR)

(72) Inventors: O-hoon Kwon, Suwon-si (KR); Ho-jin Ha, Suwon-si (KR); Guanhua Zhang, Suwon-si (KR); Hyung-tak Choi, Suwon-si (KR); Sun-bal Kim, Suwon-si (KR); Ji-Eun Keum, Suwon-si (KR); Sung-bin Im, Yongin-si (KR)

(73) Assignee: SAMSUNG ELECTRONICS CO., LTD., Suwon-si (KR)

(21) Appl. No.: 14/831,427

(22) Filed: Aug. 20, 2015

Related U.S. Patent Documents

Reissue of:
(64) Patent No.: 8,515,265
Issued: Aug. 20, 2013
Appl. No.: 12/945,194
Filed: Nov. 12, 2010

U.S. Applications:
(60) Provisional application No. 61/362,805, filed on Jul. 9, 2010, provisional application No. 61/351,434, filed
(Continued)

(30) Foreign Application Priority Data

Oct. 22, 2010 (KR) ..... 10-2010-0103697

(51) Int. Cl.
*H04N 5/783* (2006.01)
*H04N 21/2343* (2011.01)
(Continued)

(52) U.S. Cl.
CPC ... *H04N 21/23439* (2013.01); *H04L 65/4084* (2013.01); *H04L 65/4092* (2013.01);
(Continued)

(58) Field of Classification Search
CPC ..... H04N 21/23439; H04N 21/845; H04N 21/6587; H04N 21/2402; H04N 21/2387;
(Continued)

(56) References Cited

U.S. PATENT DOCUMENTS 5,612,742 A 3/1997 Krause et al.
5,784,528 A 7/1998 Yamane et al.
(Continued)

FOREIGN PATENT DOCUMENTS

CN 1290895 A 4/2001
CN 1459066 A 11/2003
(Continued)

OTHER PUBLICATIONS

International Search Report issued by the International Searching Authority in counterpart International Application No. PCT/KR2011/001268 dated Nov. 25, 2011.
(Continued)

*Primary Examiner* — Colin M LaRose
(74) *Attorney, Agent, or Firm* — Sughrue Mion, PLLC

(57) ABSTRACT

A method and apparatus for providing a trick play service in a hypertext transfer protocol (HTTP) adaptive streaming (HAS) architecture for adaptively streaming media data according to fluctuation of a streaming environment are provided. The method at a server includes: generating a media presentation description (MPD) file including information about at least one piece of trick play data; transmitting the MPD file to a client; and transmitting the at least one piece of trick play data to the client in response to a request by the client based on the MPD file. The method at a client includes: receiving a media presentation description (MPD) file including information about at least one piece of trick play data; and receiving the at least one piece of trick play data from a server based on the MPD file.

37 Claims, 23 Drawing Sheets

Related U.S. Application Data on Jun. 4, 2010, provisional application No. 61/282,860, filed on Apr. 12, 2010, provisional application No. 61/318,916, filed on Mar. 30, 2010, provisional application No. 61/310,104, filed on Mar. 3, 2010, provisional application No. 61/307,093, filed on Feb. 23, 2010, provisional application No. 61/303,778, filed on Feb. 12, 2010, provisional application No. 61/267,131, filed on Dec. 7, 2009, provisional application No. 61/260,906, filed on Nov. 13, 2009.

(51) Int. Cl.

| | |
|---|---|
| ***H04L 29/06*** | (2006.01) |
| ***H04N 21/658*** | (2011.01) |
| ***H04N 21/845*** | (2011.01) |
| ***H04N 21/235*** | (2011.01) |
| ***H04N 21/2387*** | (2011.01) |
| ***H04N 21/24*** | (2011.01) |
| ***H04N 21/6587*** | (2011.01) |

(52) U.S. Cl.

CPC ..... *H04N 21/2353* (2013.01); *H04N 21/2387* (2013.01); *H04N 21/2402* (2013.01); *H04N 21/6581* (2013.01); *H04N 21/6587* (2013.01); *H04N 21/845* (2013.01); *H04N 21/8456* (2013.01)

(58) Field of Classification Search

CPC ..... H04N 21/2353; H04N 21/8456; H04L 65/4092; H04L 65/4084

USPC ..... 386/343, 200, 264; 375/240; 709/219, 709/231; 714/752; 725/46, 105

See application file for complete search history.

(56) References Cited

U.S. PATENT DOCUMENTS 6,499,060 B1 12/2002 Wang et al.
6,536,043 B1 3/2003 Guedalia
6,851,091 B1 2/2005 Honda et al.
6,895,410 B2 5/2005 Ridge
6,996,618 B2 2/2006 Apostolopoulos et al.
7,043,560 B2 5/2006 Coulombe et al.
7,051,110 B2 * 5/2006 Hagai ..... H04N 7/17318 348/E7.071
7,057,535 B2 6/2006 Apostolopoulos et al.
7,103,668 B1 9/2006 Corley et al.
7,277,958 B2 10/2007 Chung et al.
7,421,127 B2 9/2008 Bruls et al.
7,447,791 B2 11/2008 Leaning et al.
7,504,968 B2 3/2009 Wee et al.
7,760,990 B2 7/2010 Kato
7,886,069 B2 * 2/2011 Osborne ..... 709/231
7,944,808 B2 5/2011 Yoon et al.
7,944,908 B2 5/2011 Lee et al.
8,059,711 B2 11/2011 Ramaswamy et al.
8,176,029 B2 5/2012 Wang
8,341,662 B1 12/2012 Bassett et al.
8,365,235 B2 1/2013 Hunt et al.
8,619,851 B2 12/2013 Ito
8,661,105 B2 2/2014 Tian et al.
8,781,305 B2 * 7/2014 Zhang ..... H04N 5/783 386/343
8,838,680 B1 9/2014 Jia
9,245,127 B2 1/2016 Schnell
2002/0053085 A1 5/2002 Toguri
2002/0161739 A1 10/2002 Oh
2003/0061369 A1 3/2003 Aksu et al.
2003/0072376 A1 4/2003 Krishnamachari et al.
2003/0135633 A1 * 7/2003 Dror et al. ..... 709/231
2003/0177503 A1 9/2003 Sull et al.
2003/0189649 A1 10/2003 Kuno
2003/0236895 A1 12/2003 Ohkubo et al.
2004/0064572 A1 4/2004 Yamaguchi et al.
2004/0064573 A1 4/2004 Leaning et al.
2004/0119814 A1 6/2004 Clisham et al.
2004/0220966 A1 11/2004 Ridge
2005/0018873 A1 1/2005 Rhoads
2005/0047345 A1 3/2005 Suh
2005/0071491 A1 * 3/2005 Seo ..... 709/231
2005/0102371 A1 5/2005 Aksu
2005/0123136 A1 6/2005 Shin et al.
2005/0135476 A1 6/2005 Gentric et al.
2005/0160177 A1 7/2005 Kim
2005/0183120 A1 8/2005 Jain et al.
2005/0193138 A1 9/2005 Kim
2005/0193425 A1 9/2005 Sull et al.
2005/0198282 A1 9/2005 Stahl et al.
2005/0210145 A1 9/2005 Kim et al.
2005/0234892 A1 10/2005 Tamura
2005/0262541 A1 11/2005 Oota
2006/0037057 A1 2/2006 Xu
2006/0117360 A1 6/2006 Cooper et al.
2006/0120378 A1 6/2006 Usuki et al.
2006/0126713 A1 6/2006 Chou et al.
2007/0003251 A1 1/2007 Chung et al.
2007/0016657 A1 1/2007 Ito
2007/0025687 A1 2/2007 Kim
2007/0101164 A1 5/2007 Ando et al.
2007/0177854 A1 8/2007 Ando et al.
2008/0040498 A1 2/2008 Setlur et al.
2008/0046578 A1 2/2008 van der Gaast
2008/0069204 A1 3/2008 Uchiike
2008/0109532 A1 5/2008 Denoual et al.
2008/0162713 A1 7/2008 Bowra et al.
2008/0177865 A1 7/2008 Heo et al.
2008/0195743 A1 8/2008 Brueck et al.
2008/0301380 A1 12/2008 Itho
2009/0010273 A1 1/2009 Green et al.
2009/0018681 A1 1/2009 Lee et al.
2009/0031007 A1 1/2009 Boic et al.
2009/0055417 A1 2/2009 Hannuksela
2009/0080864 A1 * 3/2009 Rajakarunanayake ..... 386/124
2009/0089535 A1 4/2009 Lohmar et al.
2009/0097819 A1 4/2009 Dui et al.
2009/0106288 A1 4/2009 Yang et al.
2009/0110060 A1 4/2009 Cortes et al.
2009/0141888 A1 6/2009 Kim et al.
2009/0150557 A1 * 6/2009 Wormley et al. ..... 709/231
2009/0161994 A1 6/2009 Sauerwein et al.
2009/0196567 A1 * 8/2009 Sugimoto ..... H04N 7/014 386/231
2009/0204487 A1 8/2009 Cansler et al.
2009/0258594 A1 10/2009 Martin-Cocher et al.
2009/0300145 A1 12/2009 Musayev et al.
2010/0046611 A1 2/2010 Toma et al.
2010/0054329 A1 3/2010 Bronstein et al.
2010/0138489 A1 6/2010 Corley et al.
2010/0235427 A1 9/2010 Sotomaru et al.
2010/0235528 A1 9/2010 Bocharov et al.
2011/0029649 A1 2/2011 Tian et al.
2011/0080940 A1 * 4/2011 Bocharov et al. ..... 375/240.01
2011/0097058 A1 * 4/2011 Fan Jiang et al. ..... 386/264
2011/0099594 A1 * 4/2011 Chen et al. ..... 725/105
2011/0119394 A1 * 5/2011 Wang et al. ..... 709/231
2011/0238789 A1 * 9/2011 Luby ..... H04L 65/601 709/219
2011/0239078 A1 * 9/2011 Luby et al. ..... 714/752
2013/0089142 A1 4/2013 Begen et al.
2013/0298170 A1 11/2013 ElArabawy et al.
2014/0053214 A1 2/2014 Walker et al.
2014/0143439 A1 5/2014 Ramamurthy
2014/0185670 A1 7/2014 Wang
2015/0256585 A1 9/2015 Brueck et al.
2016/0323342 A1 11/2016 Luby et al.

FOREIGN PATENT DOCUMENTS

CN 1481643 A 3/2004
CN 1559119 A 12/2004
CN 1568620 A 1/2005

(56) References Cited

FOREIGN PATENT DOCUMENTS

| | | | |
|---|---|---|---|
| CN | 1575603 | A | 2/2005 |
| CN | 1592418 | A | 3/2005 |
| CN | 1625880 | A | 6/2005 |
| CN | 1698378 | A | 11/2005 |
| CN | 1764974 | A | 4/2006 |
| CN | 1784652 | A | 6/2006 |
| CN | 1787422 | A | 6/2006 |
| CN | 1902865 | A | 1/2007 |
| CN | 1985321 | A | 6/2007 |
| CN | 1988547 | A | 6/2007 |
| CN | 101014947 | A | 8/2007 |
| CN | 101018323 | A | 8/2007 |
| CN | 101247511 | A | 8/2008 |
| CN | 101321265 | A | 12/2008 |
| CN | 101365128 | A | 2/2009 |
| CN | 101371307 | A | 2/2009 |
| CN | 101459809 | A | 6/2009 |
| CN | 101518027 | A | 8/2009 |
| CN | 101521583 | A | 9/2009 |
| EP | 1 043 892 | A1 | 10/2000 |
| EP | 1395014 | B1 | 6/2006 |
| EP | 2117143 | A2 | 11/2009 |
| JP | 06-252876 | A | 9/1994 |
| JP | 200013761 | A | 1/2000 |
| JP | 2000-341640 | A | 12/2000 |
| JP | 2001-024994 | A | 1/2001 |
| JP | 2001-359081 | A | 12/2001 |
| JP | 2003-087737 | A | 3/2003 |
| JP | 2003-111048 | A | 4/2003 |
| JP | 2003-235031 | A | 8/2003 |
| JP | 2004-013283 | A | 1/2004 |
| JP | 2004-88766 | A | 3/2004 |
| JP | 2004-135307 | A | 4/2004 |
| JP | 2004-140584 | A | 5/2004 |
| JP | 2004-140654 | A | 5/2004 |
| JP | 2004-516717 | A | 6/2004 |
| JP | 2004-186890 | A | 7/2004 |
| JP | 2004-215074 | A | 7/2004 |
| JP | 2004-312304 | A | 11/2004 |
| JP | 2004-328204 | A | 11/2004 |
| JP | 2005-039667 | A | 2/2005 |
| JP | 2005-073138 | A | 3/2005 |
| JP | 2005-229153 | A | 8/2005 |
| JP | 2005-303927 | A | 10/2005 |
| JP | 2006-304232 | A | 11/2006 |
| JP | 2006-311328 | A | 11/2006 |
| JP | 2007-11584 | A | 1/2007 |
| JP | 2007-25959 | A | 2/2007 |
| JP | 2007-036666 | A | 2/2007 |
| JP | 2007-518294 | A | 7/2007 |
| JP | 2007-274142 | A | 10/2007 |
| JP | 2008-97381 | A | 4/2008 |
| JP | 2008-219267 | A | 9/2008 |
| JP | 2008-236667 | A | 10/2008 |
| JP | 2009-17345 | A | 1/2009 |
| JP | 2009-134700 | A | 6/2009 |
| JP | 2009-159625 | A | 7/2009 |
| JP | 2013-505680 | A | 2/2013 |
| KR | 10-0805308 | B1 | 2/2008 |
| KR | 10-2008-0099629 | A | 11/2008 |
| KR | 10-2009-0001707 | A | 1/2009 |
| KR | 1020090028017 | A | 3/2009 |
| KR | 1020090036765 | A | 4/2009 |
| KR | 10-2009-0063775 | A | 6/2009 |
| KR | 100920733 | B1 | 10/2009 |
| KR | 1020100007368 | A | 1/2010 |
| WO | 02/49343 | A1 | 6/2002 |
| WO | 2005/043783 | A1 | 5/2005 |
| WO | 2006/105158 | A2 | 10/2006 |
| WO | 2007/095834 | A1 | 8/2007 |
| WO | 2008/062979 | A1 | 5/2008 |
| WO | 2008/130191 | A1 | 10/2008 |
| WO | 2009/119394 | A1 | 10/2009 |
| WO | 2009/158344 | A2 | 12/2009 |

OTHER PUBLICATIONS

International Search Report (PCT/ISA/210) dated Nov. 3, 2011 in the International Patent Application No. PCT/KR2011/001898.

International Search Report (PCT/ISA/210) dated Aug. 23, 2011 in the International Patent Application No. PCT/KR2010/008696.

International Search Report (PCT/ISA/210) dated Jul. 13, 2011 in the International Patent Application No. PCT/KR2010/008017.

International Search Report (PCT/ISA/210) dated Jul. 15, 2011 in the International Patent Application No. PCT/KR2010/008068.

International Search Report (PCT/ISA/210) dated Jul. 23, 2011 in the International Patent Application No. PCT/KR2010/008015.

International Search Report (PCT/ISA/210) dated Jul. 8, 2011 in the International Patent Application No. PCT/KR2010/008016.

Communication dated Jan. 19, 2017, issued by the Korean Intellectual Property Office in counterpart Korean Patent Application No. 10-2010-0103725.

Communication dated Jan. 30, 2017, issued by the Japanese Patent Office in counterpart Japanese Patent Application No. 2015-146132.

Communication dated Feb. 21, 2017, issued by the Korean Intellectual Property Office in counterpart Korean Patent Application No. 10-2010-0103698.

Communication dated Mar. 15, 2017, issued by the Korean Intellectual Property Office in counterpart Korean Patent Application No. 10-2011-011110.

Communication dated Mar. 28, 2017, issued by the State Intellectual Property Office of the People's Republic of China in counterpart Chinese Patent Application No. 201080061494.4.

Anonymous, "OIPF Release 1 Specification vol. 2—Media Formats V 1.1" Open IPTV Forum, Oct. 8, 2009, 22 pages total.

Anonymous, "Open IPTV Forum—Functional Architecture—V 1.1" Open IPTV Forum, Jan. 15, 2008, 141 pages total.

Anonymous, "OIPF Release 1 Specification vol. 3—Content Metadata V 1.1", Open IPTV Forum, Oct. 8, 2009, 47 pages total.

Communication dated Oct. 3, 2016, issued by the Japanese Patent Office in counterpart Japanese Patent Application No. 2012-553824.

Communication dated Oct. 31, 2016, issued by the Korean Intellectual Property Office in counterpart Korean Patent Application No. 10-2010-0103721.

Communication dated Oct. 31, 2016, issued by the Korean Intellectual Property Office in counterpart Korean Patent Application No. 10-2010-0103722.

Communication dated Nov. 7, 2016, issued by the Japanese Patent Office in counterpart Japanese Patent Application No. 2015-167763.

Communication dated Dec. 19, 2016, issued by the Japanese Patent Office in counterpart Japanese Patent Application No. 2015-156368.

Communication from the State Intellectual Property Office of P.R. China dated Dec. 4, 2015 in a counterpart Chinese application No. 201080061494.4.

S. Bradner, "Key words for use in RFCs to Indicate Requirement Levels", Network Working Group, Request for Comments: 2119, BCP: 14, Category: Best Current Practice, Harvard University, Mar. 1997, https://www.ietf.org/rfc/rfc2119.txt, pp. 1-3.

ETSI, "Digital Video Broadcasting (DVB); Specification for the use of Video and Audio Coding in Broadcasting Applications based on the MPEG-2 Transport Stream", ETSI TS 101 154 V1.9.1 (2009-09), Technical Specification, pp. 1-163.

ETSI, "Digital Video Broadcasting (DVB); Transport of MPEG-2 TS Based DVB Services over IP Based Networks", ETSI TS 102 034 V1.3.1 (2007-10), Technical Specification, pp. 1-128.

ITU-T, "Series H: Audiovisual and Multimedia Systems Infrastructure of audiovisual services—Transmission multiplexing and synchronization", Amendment 3: Transport of AVC video data over ITU-T Rec. H.222.0 | ISO/IEC 13818-1 streams, (Mar. 2004), ISO/IEC 13818-1:2000/Amd.3:2004 (E), International Telecommunication Union, total 26 pages.

International Standard, "Information technology—Coding of audiovisual objects—Part 12: ISO base media file format", ISO/IEC 14496-12:2005(E), Second edition Apr. 1, 2005, Corrected version Oct. 1, 2005, total 93 pages.

(56) References Cited

OTHER PUBLICATIONS

International Standard, "Information technology—Coding of audio-visual objects—Part 14: MP4 file format", ISO/IEC 14496-14:2003(E), First edition Nov. 15, 2003, total 18 pages.
International Standard, "Information technology—Coding of audio-visual objects—Part 15: Advanced Video Coding (AVC) file format", ISO/IEC 14496-15:2004(E), First edition Apr. 15, 2004, total 29 pages.
ITU-T, "Series H: Audiovisual and Multimedia Systems Infrastructure of audiovisual services—Coding of moving video", ITU-T Recommendation H.264, (Mar. 2005), International Telecommunication Union, total 382 pages.
International Standard, "Information technology—Generic coding of moving pictures and associated audio information—Part 2: Video", ISO/IEC 13818-2:2013(E), Third edition Oct. 1, 2013, total 13 pages.
ETSI, "Digital Video Broadcasting (DVB); Subtitling systems", ETSI EN 300 743 V1.3.1 (Nov. 2006), European Standard (Telecommunications series), pp. 1-51.
ETSI, "Digital Video Broadcasting (DVB); Specification for conveying ITU-R System B Teletext in DVB bitstreams", ETSI EN 300 472 V1.3.1 (May 2003), European Standard (Telecommunications series), pp. 1-11.
International Standard, "Information technology—Coding of audio-visual objects—Part 3: Audio", ISO/IEC 14496-3:2009(E), Fourth edition Sep. 1, 2009, total 18 pages.
ETSI, "Digital Audio Compression (AC-3, Enhanced AC-3) Standard", ETSI TS 102 366 V1.2.1 (Aug. 2008), Technical Specification, pp. 1-214.
International Telecommunication Union, "Terminal Equipment and Protocols for Telematic Services", Information Technology—Digital Compression and Coding of Continuous-Tone Still Images—Requirements and Guidelines, CCITT, Recommendation T.81, (Sep. 1992), ISO/IEC 10918-1 : 1993(E), total 186 pages.
International Standard, "Information technology—Coding of audio-visual objects—Part 2: Visual", ISO/IEC 14496-2:2004(E), Third edition Jun. 1, 2004, total 18 pages.
ETSI, "Universal Mobile Telecommunications System (UMTS); LTE; Transparent end-to-end Packet-switched Streaming Service (PSS); Protocols and codecs (3GPP TS 26.234 version 9.7.0 Release 9)", ETSI TS 126 234 V9.7.0 (Jan. 2012), Technical Specification, total 191 pages.
ETSI, "Digital cellular telecommunications system (Phase 2+); Universal Mobile Telecommunications System (UMTS); LTE; Transparent end-to-end packet switchedstreaming service (PSS); 3GPP file format (3GP) (3GPP TS 26.244 version 9.0.0 Release 9)", ETSI TS 126 244 V9.0.0 (Jan. 2010), Technical Specification, total 54 pages.
Communication dated Jul. 9, 2015, issued by the State Intellectual Property Office of P.R. China in counterpart Chinese Application No. 201180014696.8.
Communication dated Aug. 13, 2015, issued by the State Intellectual Property Office of P.R. China in counterpart Chinese Application No. 201080061417.9.
Communication dated Aug. 5, 2015, issued by the State Intellectual Property Office of P.R. China in counterpart Chinese Application No. 201180027573.8.
Communication dated Mar. 15, 2017, issued by the Korean Intellectual Property Office in counterpart Korean Patent Application No. 10-2011-0011110.
Alex Zambelli, "IIS Smooth Streaming Technical Overview", Microsoft Corporation, Mar. 2009, pp. 1- 17.
Communication dated Jul. 15, 2016, issued by the Korean Intellectual Property Office in counterpart Korean application No. 10-2010-0103727.
Communication dated Aug. 15, 2016, issued by the Japanese Patent Office in counterpart Japanese application No. 2015-156368.
Communication dated Sep. 12, 2016, issued by the Japanese Patent Office in counterpart Japanese application No. 2012-538764.
Communication dated Aug. 1, 2016, issued by the State Intellectual Property Office of P.R. China in counterpart Chinese application No. 201080061494.4.
Communication dated Aug. 29, 2016, issued by the Japanese Patent Office in counterpart Japanese application No. 2015-159842.
Communication dated Aug. 29, 2016, issued by the Japanese Patent Office in counterpart Japanese application No. 2012-538771.
Qualcomm Incorporated, et al., "3GPP Adaptive HTTP Streaming", Proposal to MPEG HTTP Streaming, 93rd MPEG meeting, Geneva, XP030001643, Jul. 22, 2010, pp. 1-61.
Qualcomm Incorporated, "Adaptive HTTPStreaming: Usage of the 3GPP File Format", 3GPP TSG-SA4 AHI Meeting, SA-AHI172, Mar. 2-4, 2010, Aachen, Germany, XP050437444, pp. 1-8.
Communication dated Sep. 29, 2016, issued by the European Patent Office in counterpart European Application No. 11747701.8.
Qualcomm Incorporated, "Pseudo CR: Adaptive HTTP Streaming—Full Solution Proposal", 3GPP TSG-SA4 #57, S4-100060, Jan. 25-29, 2010, St Julians, Malta, URL:http://www.3gpp.org/ftp/tsg_sa/WG4_CODEC/TSGS4_57/Docs/S4-100060.zip, total 17 pages.
Communication dated Sep. 26, 2016, issued by the Japanese Patent Office in counterpart Japanese application No. 2015-146132.
Huawei Technologies Co., Ltd., "Live Content Support in Static HTTP Streaming", 3GPP TSG-SA4 #56, S4-090857, Nov. 9-13, 2009, Sophia-Antipolis, URL:http://www.3gpp.org/ftp/tsg_sa/WG4_CODEC/TSGS4_56/Docs/S4-090857.zip France, total 6 pages.
Chen, et al., "Response to the CfP on HTTP Streaming: Adaptive Video Streaming based on AVC", International Organization for Standardisation, MPEG Meeting, Jul. 26, 2010—Jul. 30, 2010, Issue No. M17909, pp. 1-20, Geneva, Switzerland, XP030046499.
Communication dated Apr. 1, 2016, issued by the State Intellectual Property Office of the People's Republic of China in counterpart Chinese Patent Application No. 201180027573.8.
Communication dated Apr. 25, 2016, issued by the European Patent Office in counterpart European Patent Application No. 10830204.3.
Communication dated May 9, 2016, issued by the European Patent Office in counterpart European Patent Application No. 11790033.2.
Communication dated May 18, 2015, issued by the State Intellectual Property Office of the People's Republic of China in counterpart Chinese Application No. 201080061494.4.
Communication dated Apr. 27, 2015 issued by the Japanese Patent Office in counterpart Japanese Patent Application No. 2012-538768.
Communication dated Mar. 24, 2015 issued by European Patent Office in counterpart European Application No. 11756585.3.
Communication from the Japanese Patent Office dated Mar. 23, 2015 in a counterpart Japanese Application No. 2012-553824.
Communication from the State Intellectual Property Office of P.R. China dated Mar. 17, 2015 in a counterpart application No. 201080061417.9.
Communication from the Japanese Patent Office dated Apr. 13, 2015 in a counterpart Japanese application No. 2012-538771.
Communication from the Japanese Patent Office dated Feb. 2, 2015 in a counterpart Japanese application No. 2012-538765.
Communication from the Japanese Patent Office dated Apr. 6, 2015 in a counterpart Japanese application No. 2012-538764.
"Transparent End-toEnd Packet-Switched Streaming Service (PSS); Protocols and Codecs (Release 9)", 3GPP TS 26.234, Mar. 2012, 188 pages total.
"Release 2 Specification HTTP Adaptive Streaming", Open IPTV Forum, Sep. 2010, 25 pages total.
Communication dated Nov. 3, 2014, issued by the State Intellectual Property Office of the People's Republic of China in counterpart Chinese Application No. 201180014696.8.
Communication dated Dec. 19, 2014, issued by the Japanese Patent Office in counterpart Japanese Application No. 2012-543023.
Communication dated Aug. 27, 2014, issued by the State Intellectual Property Office of the People's Republic of China in counterpart Chinese Application No. 201080061494.4.
Communication dated Aug. 4, 2014, issued by the State Intellectual Property Office of the People's Republic of China in counterpart Chinese Application No. 201080061416.4.
Communication dated Aug. 5, 2014, issued by the Japanese Patent Office in counterpart Japanese Application No. 2012-538771.

(56) References Cited

OTHER PUBLICATIONS

Communication dated Aug. 20, 2014, issued by the State Intellectual Property Office of the People's Republic of China in counterpart Chinese Application No. 201080061434.2.
Communication dated Aug. 5, 2014, issued by the Japanese Patent Office in counterpart Japanese Application No. 2012-538768.
Communication dated Aug. 19, 2014, issued by the Japanese Patent Office in counterpart Japanese Application No. 2012-543023.
Communication dated Sep. 24, 2014, issued by the Japanese Patent Office in counterpart Japanese Application No. 2012-553824.
Communication dated May 22, 2014 issued by the European Patent Office in counterpart European Application No. 11790033.2.
Communication dated Jul. 2, 2014 issued by the State Intellectual Property Office of P.R. China in counterpart Chinese Application No. 201080061417.9.
Communication dated Jul. 3, 2014 issued by the State Intellectual Property Office of P.R. China in counterpart Chinese Application No. 201180010793.X.
Communication dated Jul. 1, 2014 issued by the Japanese Patent Office in counterpart Japanese Application No. 2012-538764.
Communication dated Jul. 15, 2014 issued by the Japanese Patent Office in counterpart Japanese Application No. 2012-538765.
Communication dated Feb. 7, 2014 issued by the European Patent Office in counterpart European Application No. 10830205.0.
Pantos R., et al., "HTTP Live Streaming; draft-pantos-http-live-straming-0.2.txt", Oct. 5, 2009, 20 pgs. total, XP015064407.
Alex Zambelli, "IIS Smooth Streaming Technical Overview", Mar. 31, 2009, 17 pgs. total, XP055009366.
Jin Young Lee et al., "Dash Evaluation Experiment #1: Compositions of Media Presentation (CMP) Proposal Comparison", Oct. 15, 2010, 56 pgs. total, XP030046599.
Waqar Zia, "A few comments on LGE proposal about delivery of MPEG-2-TS", Oct. 15, 2010, 3 pgs. total, XP030047157.
Communication dated Feb. 12, 2014 issued by the European Patent Office in counterpart European Application No. 10830206.8.
Communication dated Feb. 12, 2014 issued by the European Patent Office in counterpart European Application No. 10830223.3.
Communication dated Feb. 25, 2014 issued by the European Patent Office in counterpart European Application No. 10830218.3.
Communication dated Mar. 4, 2014 issued by the European Patent Office in counterpart European Application No. 10830204.3.
Jaeyeon Song, et al., "Response to Call for Proposals for HTTP Streaming of MPEG Media standard", Jul. 30, 2010, 60 pgs. total, XP030046369.
Gerard Fernando, et al., "HTTP Streaming Solution-Response to Call for Proposal", Jul. 30, 2010, 32 pgs. total, XP030046346.
European Search Report dated Apr. 25, 2014 issued by the European Patent Office in counterpart European Application No. 10836186.6.
John A. Bocharov, "Smooth Streaming Technical Overview", CM-IPTV0560, Oct. 20, 2009, 18 pgs. total, XP017826991.
Communication dated Apr. 25, 2014 issued by the European Patent Office in counterpart European Application No. 11747701.8.
Communication dated Apr. 25, 2014 issued by the European Patent Office in counterpart European Application No. 11756585.3.
Communication dated Feb. 18, 2014 issued by the State Intellectual Property Office of P.R. China in counterpart Chinese Application No. 201080055449.8.
Communication dated Apr. 15, 2014 issued by the State Intellectual Property Office of P.R. China in counterpart Chinese Application No. 201080061413.0.
International Search Report, dated Jul. 8, 2011, issued by the International Patent Office in International Application No. PCT/KR2010/008016.
Written Opinion dated Jul. 8, 2011, issued by the International Patent Office in counterpart International Application No. PCT/KR2010/008016.
Written Opinion dated Jul. 13, 2011, issued by the International Patent Office in counterpart International Application No. PCT/KR2010/008017.
Written Opinion dated Jul. 15, 2011, issued by the International Patent Office in counterpart International Application No. PCT/KR2010/008068.
International Search Report, dated Jul. 25, 2011, issued by the Patent Office in counterpart International Application No. PCT/KR2010/008015.
Written Opinion dated Jul. 25, 2011, issued by the International Patent Office in counterpart International Application No. PCT/KR2010/008015.
International Search Report, dated Aug. 31, 2011, issued by the International Searching Authority in counterpart International Application No. PCT/KR2010/008696.
Written Opinion dated Aug. 31, 2011, issued by the International Patent Office in counterpart International Application No. PCT/KR2010/008696.
International Search Report dated Nov. 25, 2011, issued by the International Patent Office in counterpart International Application No. PCT/KR2011/001268.
Written Opinion, dated Nov. 25, 2011, issued by the International Patent Office in counterpart International Application No. PCT/KR2011/001268.
Communication dated May 30, 2018, issued by the State Intellectual Property Office of P.R. China in counterpart Chinese Application No. 201080061494.4.
Communication dated Sep. 29, 2018, issued by the China National Intellectual Property Administration in counterpart Chinese Application No. 201080061494.4.
International Search Report issued by the International Searching Authority in counterpart International Application No. PCT/KR2011/0011268 on Nov. 25, 2011.
Communication dated Mar. 28, 2012 issued by the International Searching Authority in International Application No. PCT/KR2011/004064.
International Search Report dated Aug. 16, 2011 in counterpart international application No. PCT/KR2010/008060.
Written Opinion of the International Searching Authority dated Aug. 16, 2011 in counterpart international application No. PCT/KR2010/008060.

* cited by examiner

FIG. 4

```
<AdaptiveControl xsi:noNamespaceSchemaLocation="samsung_as.xsd' xmlns:xsi="http://www.w3.org/2001/XMLSchema-instance'>
    <URL Template>http://asexample.com/vod/movies/18888/Tracks/Seg{TrackID}-{SegmentID}.as</URLTemplate>
    <RefDataURL>http://asexample.com/vod/movies/18888/References/header2.ref</RefDataURL>
    <Track ID="1' Type="Video" Bitrate="500000" StartTime="00:00:00" SegmentDuration="00:00:10" SegmentStartID="1000' SegmentCount="360"/>
    <Track ID="2' Type="Video" Bitrate="1000000" StartTime="00:00:00" SegmentDuration="00:00:10' SegmentStartID="1000" SegmentCount="360"/>
    <Track ID="3' Type="Video" Bitrate="2000000" StartTime="00:00:00" SegmentDuration="00:00:10' SegmentStartID="1000" SegmentCount="360"/>
    <Track ID="4' Type="Audio" Bitrate="64000" StartTime="00:00:00" SegmentDuration="00:00:30" SegmentStartID="1000" SegmentCount="120"/>
    <Track ID="5' Type="I-Frame" Bitrate="500000" StartTime="00:00:00" SegmentDuration='00:00:10" SegmentStartID="1000" SegmentCount="360"/>
</AdaptiveControl>
```

FIG. 5

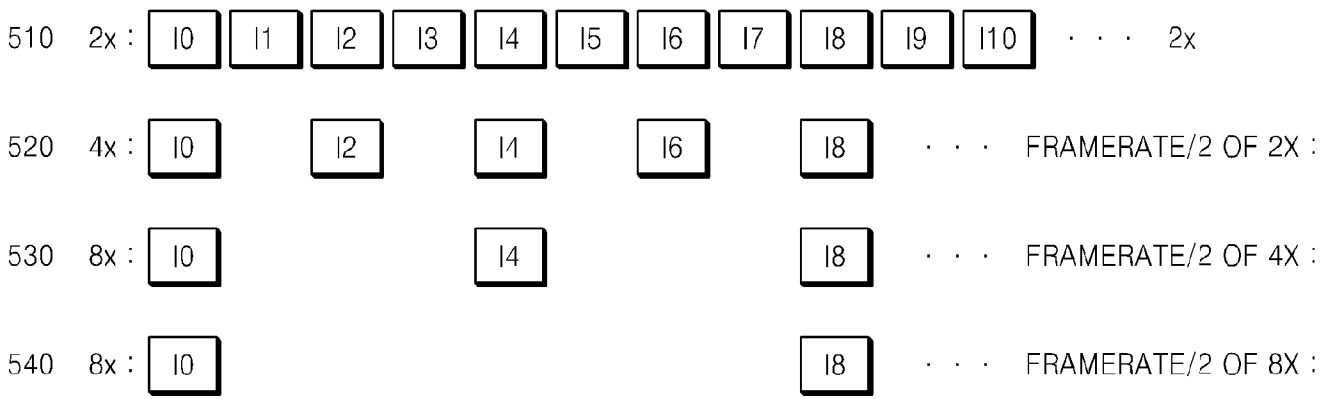

```
<MPD>
  <Period start=00:00:00>
    <Representation>
        <TrickMode>
          <AltermatePlayoutRate>2</AltermatePlayoutRate>
        </TrickMode>
        <SegmentInfo> ... </SegmentInfo>
    </Representation>
    <Representation>
        <TrickMode>
          <AltermatePlayoutRate>4</AltermatePlayoutRate>
        </TrickMode>
        <SegmentInfo> ... </SegmentInfo>
    <Representation>
  <Period>
```

FIG. 16A

```
<MPD>
  <Period start=00:00:00>
    <Representation>
        <Trickmode>
          <AlternatePlayoutRate>2</AlternatePlayoutRate>
        <Trickmode>
        <SegmentInfo> ... </SegmentInfo>
    </Representation>
    <Representation>
        <Trickmode>
          <AlternatePlayoutRate>2</AlternatePlayoutRate>
          <AlternatePlayoutRate>4</AlternatePlayoutRate>
        <Trickmode>
        <SegmentInfo> ... </SegmentInfo>
    </Representation>
    <Representation>
        <Trickmode>
          <AlternatePlayoutRate>2</AlternatePlayoutRate>
          <AlternatePlayoutRate>4</AlternatePlayoutRate>
          <AlternatePlayoutRate>8</AlternatePlayoutRate>
        <Trickmode>
        <SegmentInfo> ... </SegmentInfo>
    </Representation>
    <Representation>
        <Trickmode>
          <AlternatePlayoutRate>2</AlternatePlayoutRate>
          <AlternatePlayoutRate>4</AlternatePlayoutRate>
          <AlternatePlayoutRate>8</AlternatePlayoutRate>
          <AlternatePlayoutRate>16</AlternatePlayoutRate>
        <Trickmode>
        <SegmentInfo> ... </SegmentInfo>
    </Representation>
  </Period>
</MPD>
```

FIG. 18

```
Adaptation_field()
{
adaptation_field_length
if( adaptation_field_length > 0 )
{
  discontinuity-indicator
  random-access-indicator
  elementary-stream-priority-indicator
  PCR-flag
  OPCR-flag
  splicingpoint-flag
  transport-private-data-flag
  adaptation-field-extension-flag
  if( PCR_flag == '1' ) …
  if( OPCR_flag == '1') …
  if( splicing_point_flag == '1') …

  if (transport-private-data-flag == '1') {
    transport-private-data-length
    for (i = O; i < transport-private-data-length; i++) {
      private-data-byte
    }
  }

  if( adaptation_field_extension_flag == '1' )…
  for( I = 0 ; I < N ; i++ ) stuffing_byte
}
}
```

FIG. 24

```
<Period start"PT0s">

    <SegmentInfoDefault
        duration="PT10s"
        SourceUrlTemplatePeriod=http://exampe.com/$ReptesentaionID$/$Index$.3gp">
    </SegmentInfoDefault>

    <Represeptation mimeType="video/3gpp:code=mp4v 20.9" bandwidth="128000">
        <TrickMode alternatePlayoutRate="16" Type="Intra" FrameRate="1" />
    <SegmentInfo duration="PT10s" baseURL="rep2/"
                <InitialisationSegmentURLsourceURL="seg-init.3gp"/>
                <UrlTemplate id="1" startIndex="1" EndIndex="60"/>
    </SegmentInfo>
  </Represeptation>
</Period>
```

METHOD AND APPARATUS FOR PROVIDING TRICK PLAY SERVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a reissue application of U.S. Pat. No. 8,515,265, which was filed as U.S. patent application Ser. No. 12/945,194 on Nov. 12, 2010 and issued on Aug. 20, 2013, and which claims priority from Korean Patent Application No. 10-2010-0103697, filed on Oct. 22, 2010 in the Korean Intellectual Property Office, the disclosure of which is incorporated herein by reference in its entirety.*

CROSS-REFERENCE TO RELATED PATENT APPLICATIONS

This application claims priorities from U.S. Provisional Application No. 61/260,906, filed on Nov. 13, 2009, U.S. Provisional Application No. 61/267,131, filed on Dec. 7, 2009, U.S. Provisional Application No. 61/303,778, filed on Feb. 12, 2010, U.S. Provisional Application No. 61/307,093, filed on Feb. 23, 2010, U.S. Provisional Application No. 61/310,104, filed on Mar. 3, 2010, U.S. Provisional Application No. 61/318,916, filed on Mar. 30, 2010, U.S. Provisional Application No. 61/282,860, filed on Apr. 12, 2010, U.S. Provisional Application No. 61/351,434, filed on Jun. 4, 2010, U.S. Provisional Application No. 61/362,805, filed on Jul. 9, 2010, in the U.S. Patents and Trademark Office, and Korean Patent Application No. 10-2010-0103697, filed on Oct. 22, 2010 in the Korean Intellectual Property Office, the disclosures of which are incorporated herein in their entireties by reference.

BACKGROUND

1. Field

Apparatuses and methods consistent with exemplary embodiments relate to a method and apparatus for providing a trick play service, and more particularly, to a method and apparatus for providing a trick play service in a hypertext transfer protocol (HTTP) adaptive streaming (HAS) architecture for adaptively streaming media data according to fluctuation of a streaming environment.

2. Description of the Related Art

Examples of a method of transmitting media data through a network include a downloading method and a streaming method. In the streaming method, a server transmits media data in real time and a client reproduces the received media data in real time. In the downloading method, media data is reproduced by the client after completely receiving the media data from the server.

According to the streaming method, the media data is transmitted, received, and played in real time through a logical channel set between the server and the client.

SUMMARY

One or more exemplary embodiments provide a method and apparatus for providing a trick play service in a hypertext transfer protocol (HTTP) adaptive streaming (HAS) architecture for adaptively streaming media data according to fluctuation of a streaming environment, and a computer readable recording medium having recorded thereon a computer program for executing the method.

According to an aspect of an exemplary embodiment, there is provided a method of providing a trick play service at a server, the method including: generating a media presentation description (MPD) file including information about at least one piece of trick play data; transmitting the MPD file to a client; and transmitting the at least one piece of trick play data to the client in response to a request by the client based on the MPD file.

The MPD file may include type information identifying that the at least one piece of trick play data is data for trick play.

A number of the at least one piece of trick play data may be determined based on a maximum trick play speed, and the at least one piece of trick play data may include one or more segments generated by encoding media content at a predetermined bit rate into frames corresponding to a predetermined trick play speed and dividing the encoded frames based on time.

The MPD file may include information about the predetermined trick play speed, and uniform resource locators (URLs) of the one or more segments divided and generated based on time to be played exclusively at the predetermined trick play speed.

The MPD file may include information about trick play data corresponding to a 2× trick play speed, which physically exists in the server, and information about at least one piece of trick play data corresponding to play speeds other than 2×, which virtually exists in the server, and the method may further include extracting the at least one piece of trick play data corresponding to play speeds other than 2× from the trick play data corresponding to a 2× trick play speed upon a request of the client based on the MPD file.

The extracting the at least one piece of trick play data corresponding to play speeds other than 2× may be performed by using a common gateway interface (CGI) program based on an index file including locations and sizes of frames.

The number of the at least one piece of trick play data may be determined based on a maximum depth of trick levels, the at least one piece of trick play data may include one or more segments generated by encoding media content at a predetermined bit rate into frames corresponding to a predetermined trick level and dividing the encoded frames based on time, the predetermined trick level may correspond to a hierarchical structure and may be one of at least one trick level based on the maximum depth of trick levels, the maximum depth of trick levels may be determined based on a maximum trick play speed, and the frames included in the predetermined trick level may not repeatedly exist in another trick level.

The MPD file may include information about the predetermined trick level, and URLs of the one or more segments divided and generated based on time and corresponding to the predetermined trick level, and the predetermined trick level may be described to include information about at least one trick play speed using the one or more segments divided and generated based on time.

The MPD file may further include information about at least one of a frame rate, a frame type, and the maximum trick play speed, the frame rate may indicate the number of frames to be played per second at the client, and the frame type may indicate whether the at least one piece of trick play data includes only intra-frames, or intra- and inter-frames.

According to an aspect of another exemplary embodiment, there is provided a method of providing a trick play service at a client, the method including: receiving a media presentation description (MPD) file including information about at least one piece of trick play data; and receiving the at least one piece of trick play data from a server based on the MPD file.

The MPD file may include type information identifying that the at least one piece of trick play data is data for trick play.

A number of the at least one piece of trick play data may be determined based on a maximum trick play speed, and the at least one piece of trick play data may include one or more segments generated by encoding media content at a predetermined bit rate into frames corresponding to a predetermined trick play speed and dividing the encoded frames based on time.

The MPD file may include information about the predetermined trick play speed, and uniform resource locators (URLs) of the one or more segments divided and generated based on time and are to be played exclusively at the predetermined trick play speed.

The MPD file may include information about trick play data corresponding to a 2× trick play speed, which physically exists in the server, and information about at least one piece of trick play data corresponding to play speeds other than 2×, which virtually exists in the server, and the receiving the at least one piece of trick play data from the server may include receiving, from the server, the at least one piece of trick play data corresponding to play speeds other than 2×, which is extracted at the server from the trick play data corresponding to a 2× trick play speed in response to the request of the client based on the MPD file.

The at least one piece of trick play data corresponding to play speeds other than 2× may be extracted at the server from the trick play data corresponding to a 2× trick play speed by using a common gateway interface (CGI) program based on an index file including locations and sizes of frames The number of the at least one piece of trick play data may be determined based on a maximum depth of trick levels, the at least one piece of trick play data may include one or more segments generated by encoding media content at a predetermined bit rate into frames corresponding to a predetermined trick level and dividing the encoded frames based on time, the predetermined trick level may correspond to a hierarchical structure and may be one of at least one trick level based on the maximum depth of trick levels, the maximum depth of trick levels may be determined based on a maximum trick play speed, and the frames included in the predetermined trick level may not repeatedly exist in another trick level.

The MPD file may include information about the predetermined trick level, and URLs of the one or more segments divided and generated based on time and corresponding to the predetermined trick level, and the predetermined trick level may be described to include information about at least one trick play speed using the plurality of segments divided and generated based on time.

The receiving the at least one piece of trick play data from the server may include receiving, from the server, the at least one piece of trick play data corresponding to each trick level in order to support a predetermined trick play speed based on a request of the client.

The method may further include realigning the at least one piece of trick play data in an order of play time.

The MPD file may further include information about at least one of a frame rate, a frame type, and the maximum trick play speed, the frame rate may indicate the number of frames to be played per second by the client, and the frame type may indicate whether the at least one piece of trick play data includes only intra-frames, or intra- and inter-frames.

The method may further include varying the frame rate into the number of frames per second corresponding to the predetermined trick play speed.

The method may further include playing the at least one piece of trick play data based on the frame rate.

According to an aspect of another exemplary embodiment, there is provided a computer readable recording medium having recorded thereon a computer program for executing the above method.

According to an aspect of another exemplary embodiment, there is provided a server including: an information generation unit which generates a media presentation description (MPD) file including information about at least one piece of trick play data; an information transmission unit which transmits the MPD file to a client; and a trick play data transmission unit which transmits the at least one piece of trick play data to the client in response to a request by the client based on the MPD file.

According to an aspect of another exemplary embodiment, there is provided a client including: an information reception unit which receives a media presentation description (MPD) file including information about at least one piece of trick play data; and a trick play data reception unit which receives the at least one piece of trick play data from the server based on the MPD file.

According to an aspect of another exemplary embodiment, there is provided a method of providing a trick play service at an encoder, the method including: generating at least one piece of trick play data from a media content according to a predetermined generating method that corresponds to information included in a media presentation description (MPD) file that is transmitted to a client and based on which the client requests the at least one piece of trick play data.

According to an aspect of another exemplary embodiment, there is provided a system including: an encoder which generates at least one piece of trick play data from a media content; and a server which includes: an information generation unit which generates a media presentation description (MPD) file including information about the at least one piece of trick play data, an information transmission unit which transmits the MPD file to a client, and a trick play data transmission unit which transmits the at least one piece of trick play data to the client in response to a request by the client based on the MPD file.

BRIEF DESCRIPTION OF THE DRAWINGS

The above and/or other aspects will become more apparent by describing in detail exemplary embodiments with reference to the attached drawings in which:

FIG. 4 is a diagram showing a media presentation description (MPD) including type information for identifying trick play data, according to an exemplary embodiment;

FIG. 5 is a structural diagram of trick play data including intra (I)-frames for trick play in units of multiples of two, according to an exemplary embodiment;

FIGS. 15 and 16A are diagrams showing MPDs of a method of providing a trick play service by using multiple streams having a hierarchical structure, according to an exemplary embodiment;

FIG. 18 is a diagram for describing a method of forming a TS packet for detecting an I-frame from an MPEG TS, according to an exemplary embodiment;

FIG. 24 is a diagram showing an MPD of a method of providing a trick play service by varying a frame rate, according to an exemplary embodiment;

DETAILED DESCRIPTION OF EXEMPLARY EMBODIMENTS

Figure 1:
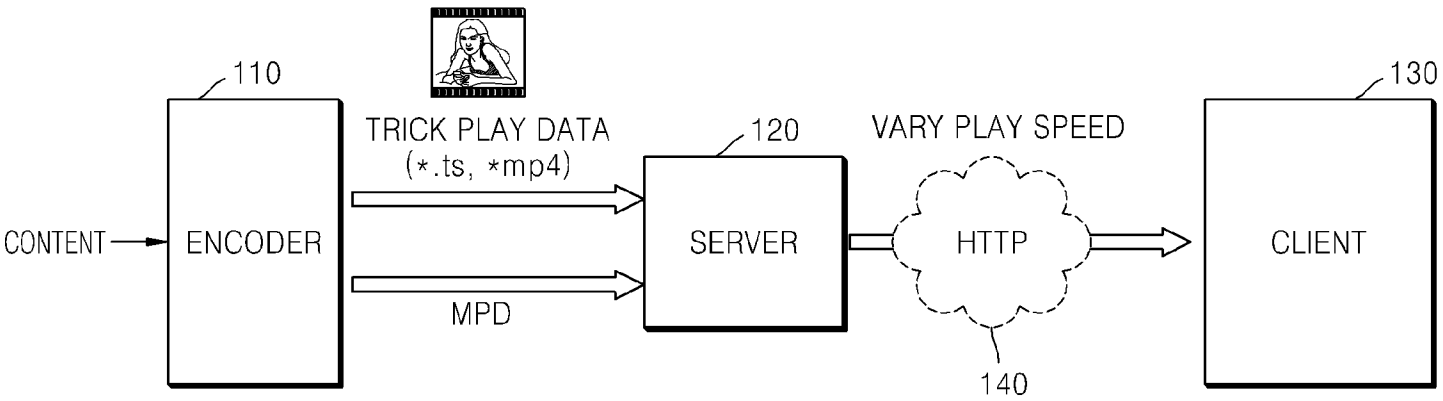
FIG. 1 is a block diagram of a system for providing a trick play service, according to an exemplary embodiment.

Hereinafter, exemplary embodiments will be described in detail with reference to the attached drawings. In the drawings, like reference numerals denote like elements and the sizes or thicknesses of elements may be exaggerated for clarity of explanation. Expressions such as "at least one of," when preceding a list of elements, modify the entire list of elements and do not modify the individual elements of the list.

FIG. 1 is a block diagram of a system 100 for providing a trick play service, according to an exemplary embodiment. Referring to FIG. 1, the system 100 includes an encoder 110, a server 120, and a client 130.

The encoder 110 generates trick play data by encoding input media content into frames at a predetermined bit rate. When the trick play data is generated, the encoder 110 may encode the media content by using only intra-frames, or intra- and inter-frames. The intra (I)-frames are frames encoded by using information of only corresponding frames. The inter-frames are frames encoded by using information of corresponding frames and other frames, and include predicted (P)-frames and bidirectional (B)-frames. The encoder 110 encodes the trick play data at a play start point by using the I-frames.

The trick play data may be encoded at a low bit rate, though it is understood that the trick play data may be encoded by using any bit rate. The trick play data indicates a trick play track or a trick play stream. The trick play data provides at least one of "fast forward" and "fast rewind" operability. The encoder 110 may be included in or may be physically separated from the server 120.

The encoder 110 may generate at least one piece of trick play data by using the same media content, and the number of generated pieces of trick play data may vary according to a respective method of providing a trick play service.

For example, in a method of providing a trick play service by using multiple streams according to an exemplary embodiment, the number of pieces of the trick play data may be determined based on a maximum trick play speed. In this case, if the maximum trick play speed is 16× and the trick play service is provided in units of multiples of two, the number of pieces of the trick play data is 4 and the trick play data includes a piece of trick play data corresponding to a 2× trick play speed, a piece of trick play data corresponding to a 4× trick play speed, a piece of trick play data corresponding to a 8× trick play speed, and a piece of trick play data corresponding to a 16×trick play speed. Hereinafter, multiple streams indicate at least one piece of trick play data.

In a method of providing a trick play service by using a frame range query according to an exemplary embodiment, the trick play data may be one piece of trick play data corresponding to a 2× trick play speed. Upon a request of the client 130 that receives from the server 120 an index file including locations and sizes of frames, trick play data corresponding to play speeds other than 2× are extracted from the trick play data corresponding to the 2× trick play speed.

In a method of providing a trick play service by using virtual streams according to an exemplary embodiment, the trick play data may be one piece of trick play data corresponding to a 2× trick play speed. In response to a request by the client 130, trick play data corresponding to play speeds other than 2× are extracted from the trick play data corresponding to the 2× trick play speed by using a common gateway interface (CGI) program of the server 120 based on an index file including locations and sizes of frames. Hereinafter, virtual streams indicate at least one piece of trick play data corresponding to play speeds other than 2×.

In a method of providing a trick play service by using multiple streams having a hierarchical structure according to an exemplary embodiment, the number of pieces of the trick play data may be determined based on a maximum depth of trick levels. The maximum depth of trick levels is determined based on a maximum trick play speed. For example, if the maximum trick play speed is 16× and the trick play service is provided in units of multiples of two, the maximum depth of trick levels is 4 and the number of pieces of the trick play data is 4. The four pieces of the trick play data correspond to trick levels TL1, TL2, TL3, and TL4. Hereinafter, multiple streams having a hierarchical structure indicate at least one piece of trick play data corresponding to each trick level.

In a method of providing a trick play service by varying a frame rate according to an exemplary embodiment, the trick play data may be one piece of trick play data corresponding to a 2× trick play speed. Play speeds other than 2× may be supported by varying a frame rate of the trick play data corresponding to a 2× trick play speed at the client 130.

The above five exemplary methods of providing a trick play service will be described in detail below with reference to FIGS. 5 through 24.

The server 120 receives at least one piece of trick play data from the encoder 110 and, in this case, information about the trick play data. The information about the trick play data may be described as a media presentation description (MPD) file, though it is understood that another exemplary embodiment is not limited thereto, and any method may be used to describe the information about the trick play data. The information about the trick play data may include, for example, at least one of a bit rate, a type, an identifier, a uniform resource locator (URL) template of the trick play data, etc., and will be described in detail below with reference to FIG. 4.

The client 130 receives from the server 120 the MPD file including the information about the trick play data and requests the server 120 for at least one piece of trick play data based on the MPD file.

In the method of providing a trick play service by using multiple streams, the client 130 requests a piece of trick play data corresponding to a desired trick play speed from among at least one piece of trick play data.

In the method of providing a trick play service by using a frame range query, the client 130 receives an index file with reference to a URL of the index file, which may be included in the MPD file, and requests trick play data including frames corresponding to a desired trick play speed based on the index file.

In the method of providing a trick play service by using virtual streams, the client 130 requests a piece of virtual trick play data corresponding to a desired trick play speed from among at least one piece of virtual trick play data.

In the method of providing a trick play service by using multiple streams having a hierarchical structure, the client 130 requests at least one piece of trick play data corresponding to each trick level in order to support a desired trick play speed. The number of trick levels and the number of pieces of the trick play data corresponding to the trick levels and for supporting the desired trick play speed will be described in detail below with reference to FIGS. 12A through 16B.

In the method of providing a trick play service by varying a frame rate, the client 130 requests for a piece of trick play data corresponding to a default play speed (e.g., 2×). The client 130 may support play speeds other than the default play speed by varying a frame rate.

If the client 130 requests the server 120 to transmit at least one piece of trick play data, the server 120 transmits the requested trick play data to the client 130.

The MPD file and the trick play data may be requested and transmitted by using a hypertext transfer protocol (HTTP), though it is understood that another exemplary embodiment is not limited thereto, and another protocol may be used.

The trick play data may encode media content at a predetermined bit rate into frames corresponding to a predetermined trick play speed, and may include at least one of a plurality of segments divided and generated based on time. That is, the trick play data generated as a result of encoding performed by the encoder 110 may include at least one segment divided based on time. The server 120 may divide the media content into a plurality of segments to separately transmit the segments rather than encoding the media content into one stream to transmit the stream continuously. The media content may be divided in units of a predetermined time, such as 10 seconds or 20 seconds, and thus may be generated as at least one segment. The time used for division may be set based on a group of pictures (GOP). Media data corresponding to pictures of one or more GOPs may be set as one segment.

Since the trick play data is divided based on time, the trick play service may be provided more efficiently. For example, when streaming is started, the server 120 transmits a segment corresponding to a time from 0 seconds to 20 seconds of 2× trick play data. Then, if the client 130 requests 4× trick play data after 20 seconds, the server 120 may transmit a segment corresponding to a time from 20 seconds to 40 seconds of 4× trick play data. Since the trick play data is divided into a plurality of segments based on time, even while trick play streaming is performed, segments of different trick play data may be transmitted upon a request of the client 130.

According to an exemplary embodiment, the trick play service may be provided in an HTTP adaptive streaming (HAS) architecture for adaptively streaming media data according to fluctuation of a streaming environment. Since the server 120 provides trick play data separately from normal speed play data, the client 130 may efficiently change play speeds between a normal speed play mode and a trick play mode.

In the method of providing a trick play service by using multiple streams, since the server 120 provides trick play data corresponding to various trick play speeds, the client 130 may efficiently change trick play speeds.

In the method of providing a trick play service by using a frame range query and a method of providing a trick play service by using virtual streams, since the server 120 retains only trick play data corresponding to a 2× trick play speed, a memory space may be saved and the trick play service may be provided at various trick play speeds.

In the method of providing a trick play service by using multiple streams having a hierarchical structure, since frames included in a predetermined trick level do not repeatedly exist in another trick level, a memory space may be saved and the trick play service may be provided at various trick play speeds. Also, since trick play is performed gradually from a high trick level to a low trick level in consideration of a trick play environment such as a network bandwidth, the trick play service may be provided adaptively to the trick play environment.

In the method of providing a trick play service by varying a frame rate, since the server 120 provides to the client 130 information about a frame rate and a frame type as well as information about a maximum trick play speed, the client 130 may be provided with the information about the frame rate, and the frame type without parsing the entire trick play data transmitted from the server 120, and the client 130 may efficiently provide the trick play service at various trick play speeds by simply varying the provided frame rate.

Figure 2:
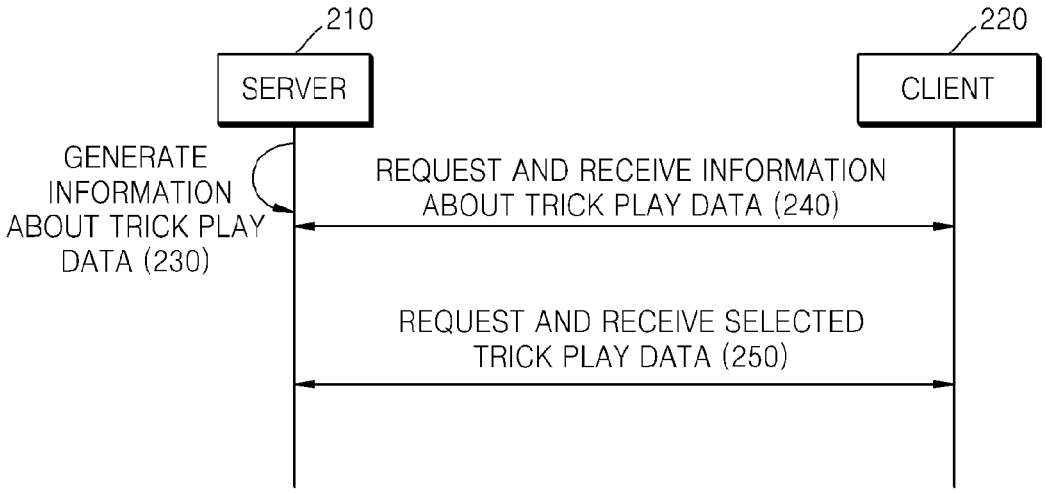
FIG. 2 is a flowchart of a method of providing a trick play service, according to an exemplary embodiment.

FIG. 2 is a flowchart of a method of providing a trick play service, according to an exemplary embodiment.

Referring to FIG. 2, in operation 230, a server 210 generates an MPD file including information about at least one piece of trick play data. The information about the trick play data may include, for example, at least one of a bit rate, a type, an identifier, a URL template of the trick play data, etc.

In operation 240, the client 220 requests the server 210 for the MPD file including the information about the trick play data and receives the requested MPD file from the server 210.

In operation 250, the client 220 requests the server 210 to transmit at least one piece of the trick play data. The client 220 selects at least one piece of the trick play data corresponding to desired trick play speeds with reference to the MPD file including the information about the trick play data, requests the server 210 for the selected trick play data, and receives the requested trick play data from the server 210.

The MPD file and the trick play data may be requested and transmitted by using an HTTP, though it is understood that another exemplary embodiment is not limited thereto, and another protocol may be used.

Figure 3:
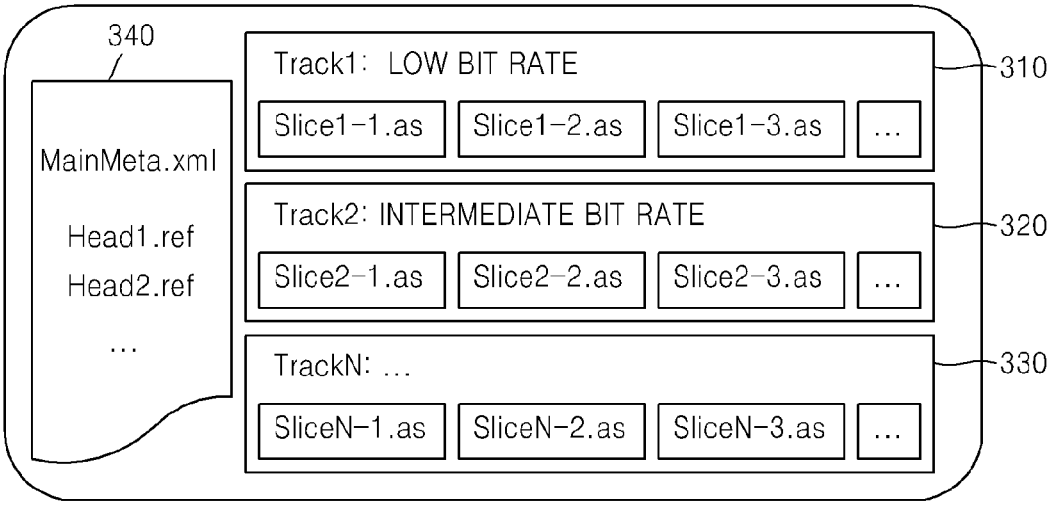
FIG. 3 is a diagram showing trick play data according to an exemplary embodiment.

FIG. 3 is a diagram showing trick play data according to an exemplary embodiment.

Referring to FIG. 3, the server 120 may include a plurality of pieces of media data 310 and 320 generated by encoding a media content at a plurality of different bit rates. As shown, the server 120 also includes at least one piece of trick play data 330. For example, "TrackN" may indicate the trick play data 330. Also, the trick play data 330 may include at least one segment generated by dividing the trick play data 330 based on time. In the present exemplary embodiment, "SliceN-1.as", "SliceN-2.as", and "SliceN-3.as" indicate segments of the trick play data 330.

Also, the server 120 may include information 340 used by the client 130 to access the trick play data 330. For example, the information 340 may include a "MainMeta.xml" file as information about the trick play data 330 and a "HeadN.ref" file as header information of the trick play data 330. In FIG. 3, "Head1.ref" may indicate a header file of "Track1" and "Head2.ref" may indicate a header file of "Track2."

The "MainMeta.xml" file is an MPD file. The MPD file may be obtained by the client 130 based on a content access descriptor (CAD) file including information about the media content according to the open IPTV forum (OIPF) standard, though it is understood that another exemplary embodiment is not limited thereto. For example, according to another exemplary embodiment, the client 130 obtains the MPD file by directly requesting the server 120 without reference to the CAD file. Also, it is understood that the "Head1.ref" and "Head2.ref" files may be omitted, for example, where headers are included in the trick play data 330.

The server 120 may include at least one piece of the trick play data 330 and the number of pieces of the trick play data 330 varies according to a respective method of providing a trick play service.

FIG. 4 is a diagram showing an MPD including type information for identifying trick play data, according to an exemplary embodiment.

Referring to FIG. 4, the MPD includes a template tag about a URL of the trick play data, a tag for defining the location of a header, and track tags for defining a plurality of pieces of media data and at least one piece of the trick play data.

A "URLTemplate" tag defines a common segment of URL information of the trick play data. For example, if "http://asexample.com/vod/movies/18888/Tracks/Seg{TrackID}-{SegmentID}.as" is a URL template, the URL of the trick play data may be defined by substituting an identifier of at least one trick play data and an identifier of at least one segment of the trick play data with "TrackID" and "SegmentID".

A "RefDataURL" tag defines a URL of a header of the trick play data.

A plurality of "Track" tags are used to define a plurality of pieces of media data generated by encoding media content to have different bit rate qualities, and at least one piece of the trick play data. Each "Track" tag includes an "ID" attribute, a "Type" attribute, a "BitRate" attribute, a "StartTime" attribute, a "SegmentDuration" attribute, a "SegmentStartID" attribute, and a "SegmentCount" attribute.

Hereinafter, each attribute will be described based on a "Track" tag for defining the trick play data.

The "ID" attribute defines a name of the trick play data and may be an identifier of the trick play data. The "Type" attribute defines a type of the trick play data. With respect to the trick play data, information for identifying the trick play data from among audio data, video data, audio/video data, and the trick play data may be defined as the "Type" attribute. The information for identifying the trick play data may be described by using various types of information such as "I-Frame" and "Trick Play."

The "Bitrate" attribute defines a bit rate of the trick play data, the "StartTime" attribute defines a time stamp for specifying a start time of the trick play data, the "SegmentDuration" attribute defines a duration of segments included in the trick play data, and the "SegmentStartID" attribute defines a number of a segment that initially starts and defines an identifier of at least one segment included in the trick play data.

The "SegmentConunt" attribute defines a total number of segments included in the trick play data.

Although not shown in FIG. 4, a "Segment" tag is a sub tag of the "Track" tag. If the trick play data includes at least one segment generated by encoding media content at a predetermined bit rate and dividing the encoded media content based on time, each segment may be defined.

In the "Segment" tag, an "IntNum" attribute defines a number of the corresponding segment, and a "StartTime" tag defines a start time of the corresponding segment. Furthermore, a "Duration" tag defines a duration of the corresponding segment, and a "url" tag defines a URL of the corresponding segment.

It is understood that in another exemplary embodiment, the "Segment" tag may be omitted, for example, if information about at least one segment included in the trick play data may be inferred from other attributes of the "Track" tag. In this case, the "Segment" tag may not be included in an MPD if the information about at least one segment included in the trick play data may be inferred from the "StartTime", "SegmentStartID", "SegmentDuration", and "SegmentCount" attributes of the "Track" tag. Also, a "url" attribute of the "Segment" tag may be omitted, for example, if a predetermined template is defined in the "URLTemplate" tag, and URLs of segments are inferred by substituting an identifier of the trick play data and an identifier of at least one segment included in the trick play data with the defined predetermined template.

FIG. 5 is a structural diagram of trick play data including I-frames for trick play in units of multiples of two, according to an exemplary embodiment.

Referring to FIG. 5, the trick play data is formed of I-frames in order to allow the trick play data to be decoded by using only the trick play data. If trick play is performed in units of multiples of two, the trick play data for various trick plays includes I-frames corresponding to desired trick play speeds while the number of frames (or a frame rate) is reduced by half.

For example, first trick play data 510 corresponding to a 2× trick play speed is formed by extracting a frame as an I-frame every 2 seconds, and a decoder trick-plays a frame corresponding to a 2× trick play speed every 2 seconds. Second trick play data 520 corresponding to a 4× trick play speed may be formed by reducing a frame rate of the trick play data 510 corresponding to a 2× trick play speed by half. Third trick play data 530 corresponding to a 8× trick play speed may be formed by reducing a frame rate of the trick play data 520 corresponding to a 4× trick play speed by half. Fourth trick play data 540 corresponding to a 16× trick play speed may be formed by reducing a frame rate of the trick play data 530 corresponding to a 8× trick play speed by half.

Also, trick play data corresponding to a trick play speed of a multiple of a decimal (e.g., 2.5×) may be formed by adjusting the frame rate.

Meanwhile, although not shown in FIG. 5, the trick play data may also be encoded by using inter-frames in addition to I-frames. The inter-frames may include at least one of B-frames and P-frames. In this case, the trick play data at a play start time may be encoded by using at least one I-frame.

Figure 6:
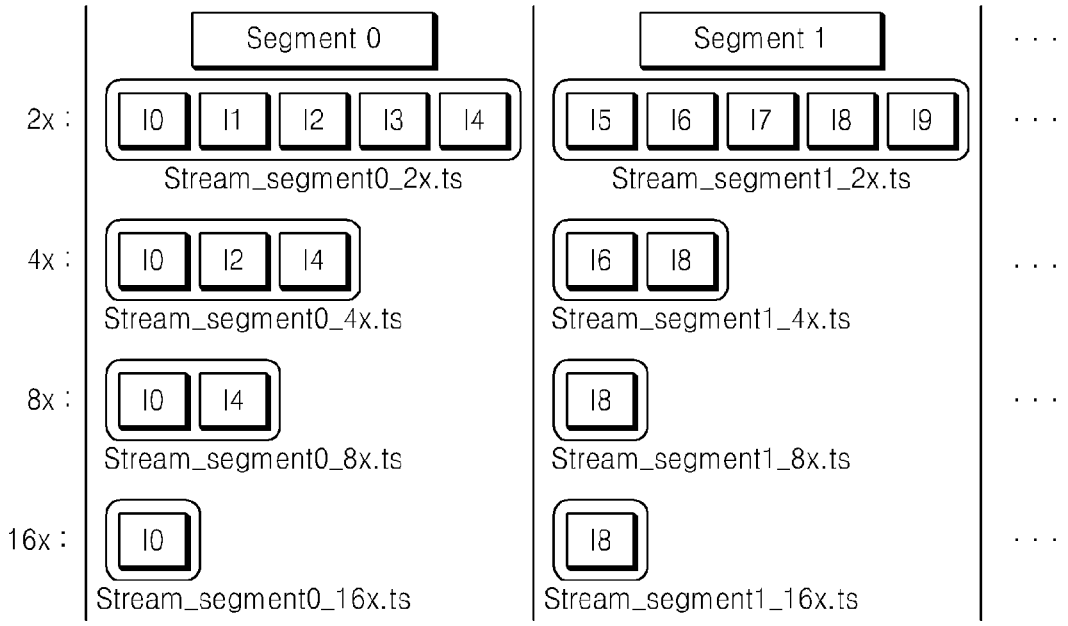
FIG. 6 is a diagram for describing a method of providing a trick play service by using multiple streams, according to an exemplary embodiment.

FIG. 6 is a diagram for describing a method of providing a trick play service by using multiple streams, according to an exemplary embodiment.

In the present exemplary embodiment, at least one piece of trick play data supports different trick play speeds. Referring to FIG. 6, "Stream_segment0_2×.ts, Stream_segment1_2×.ts, . . . " are 2× trick play data, "Stream_segment0_4×.ts, Stream_segment1_4×.ts, . . . " are 4× trick play data, "Stream_segment0_8×.ts, Stream_segment1_8×.ts, . . . " are 8× trick play data, and "Stream_segment0_16×.ts, Stream_segment1_16×.ts, . . . " are 16× trick play data. In this case, the number of pieces of the trick play data is determined based on a maximum trick play speed. Accordingly, in FIG. 6, the number of pieces of the trick play data is 4.

An MPD file includes information about the trick play data. The client 130 requests the server 120 for one piece of trick play data corresponding to a desired trick play speed. Since the one piece of the trick play data includes at least one segment divided and generated based on time, the client 130 receives from the server 120 at least one segment of the corresponding trick play data according to the flow of time.

Figure 7:
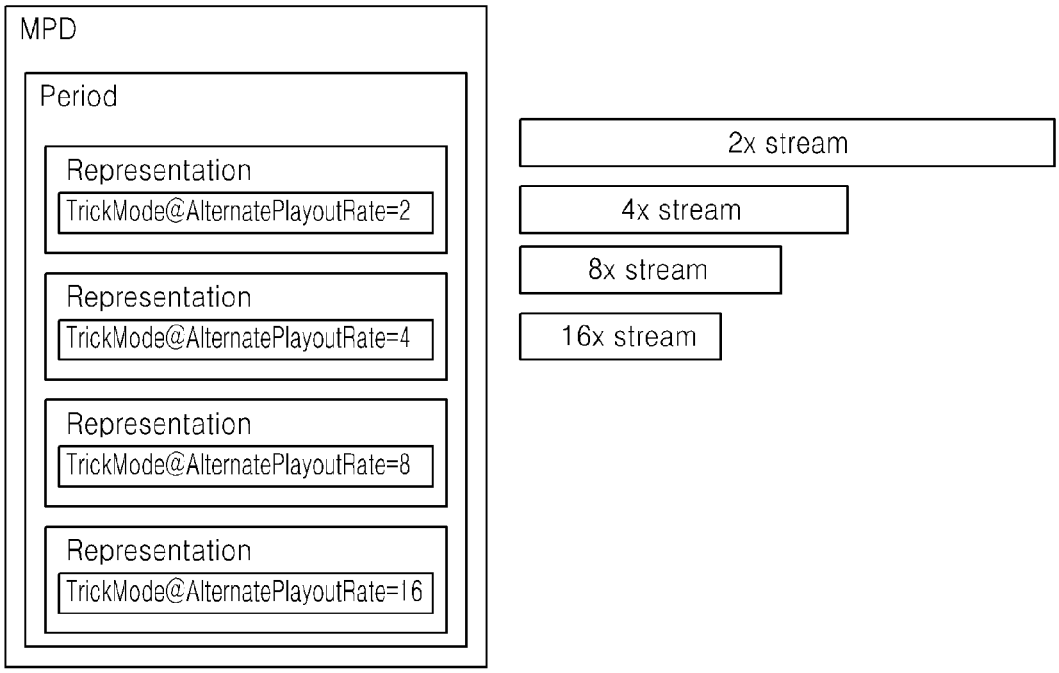
FIGS. 7 and 8 are diagrams showing MPDs of a method of providing a trick play service by using multiple streams, according to exemplary embodiments.
Figures 8, 9:
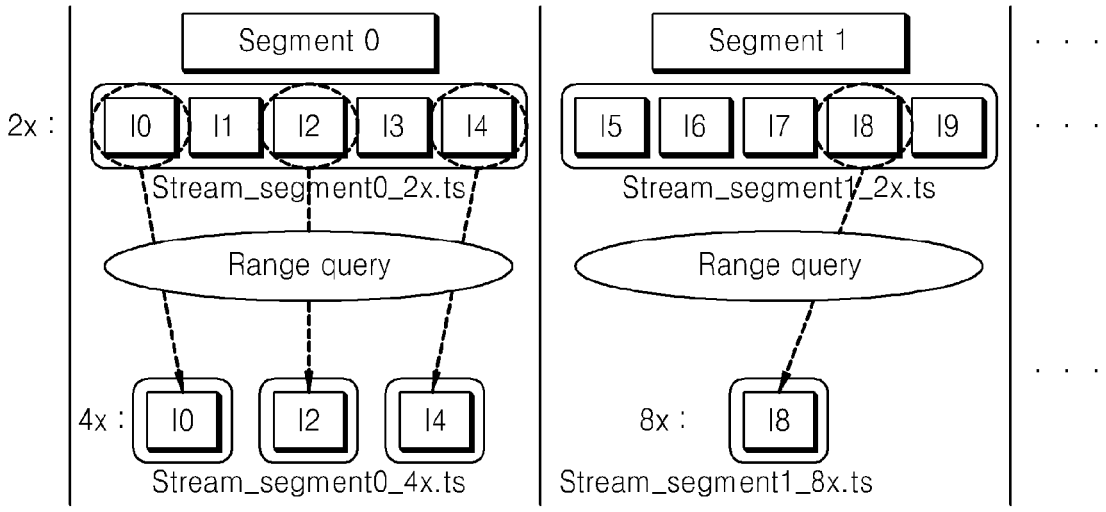
FIG. 9 is a diagram for describing a method of providing a trick play service by using a frame range query, according to an exemplary embodiment.

FIGS. 7 and 8 are diagrams showing MPDs of a method of providing a trick play service by using multiple streams, according to exemplary embodiments.

In the present exemplary embodiment, a trick play speed corresponding to trick play data may be defined by an "AlternatePlayoutRate" attribute, though it is understood that the name of the attribute may vary.

Referring to FIGS. 7 and 8, "<AlternatePlayoutRate>2</AlternatePlayoutRate>" indicates that the corresponding trick play data is 2× trick play data. "<AlternatePlayoutRate>4</AlternatePlayoutRate>" indicates that the corresponding trick play data is 4× trick play data.

FIG. 9 is a diagram for describing a method of providing a trick play service by using a frame range query, according to an exemplary embodiment.

Referring to FIG. 9, in the method of providing a trick play service by using a frame range query, the server 120 includes one piece of trick play data corresponding to a 2× trick play speed, and an index file including locations and sizes of frames. The client 130 may receive from the server 120 the index file with reference to a URL of the index file, which is included in an MPD file.

The client 130 receives the index file from the server 120 and requests the trick play data including frames corresponding to a desired trick play speed by using the index file. The client 130 requests the trick play data including frames corresponding to the desired trick play speed by transmitting to the server 120 an HTTP range query (or an HTTP range request) including locations and sizes of frames to be requested. The location of the frame is described in a "Content Range" field of an HTTP and the size of the frame is described in a "Content Length" field of the HTTP.

The server 120 forms a frame as trick play data based on the HTTP range query including the locations and sizes of frames, and transmits the corresponding trick play data to the client 130 by using an HTTP range response (or an HTTP partial response).

While in the present exemplary embodiment, the frame is identified and transmitted by using an HTTP, it is understood another exemplary embodiment is not limited thereto, and another protocol may be used.

Figure 10:
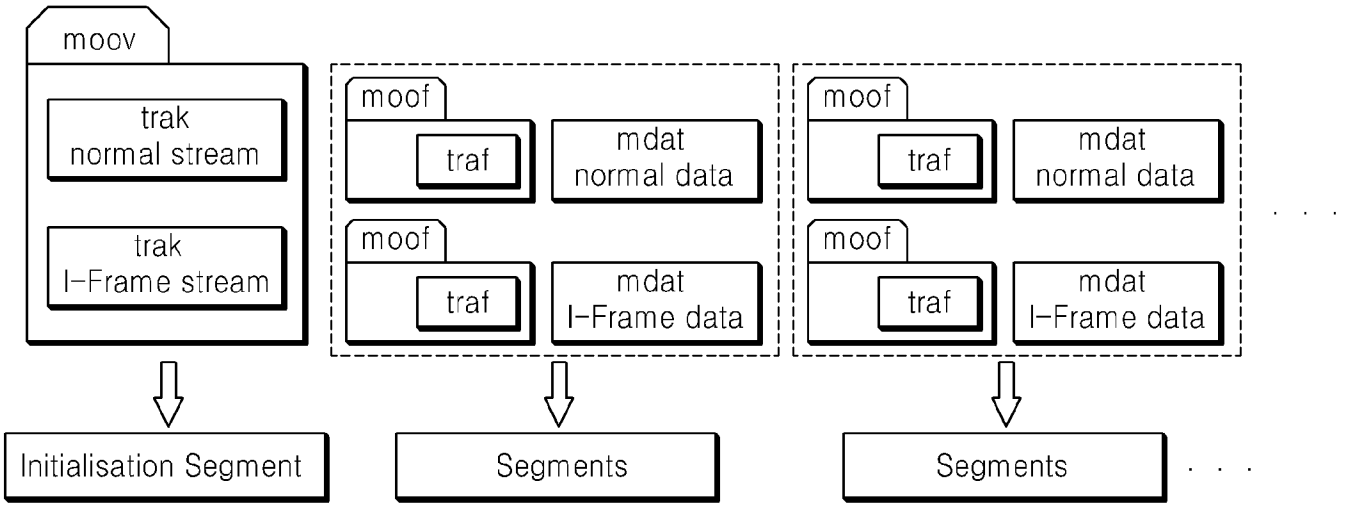
FIG. 10 is a structural diagram of an MP4 file for performing a method of providing a trick play service by using a frame range query, according to an exemplary embodiment.

FIG. 10 is a structural diagram of an MP4 file for performing a method of providing a trick play service by using a frame range query, according to an exemplary embodiment.

An MP4 file is a file of a Moving Picture Experts Group (MPEG)-4 part 14 video compression coding standard of the International Organization for Standardization/International Electro-technical Commission Joint Technical Committee 1 (ISO/IEC JTC 1), and is also referred to as an MP4 container. A default extension of the MP4 file is ".mp4."

Referring to FIG. 10, each piece of trick play data in the MP4 file corresponds to a track of the MP4 file. A "trak" box of each track includes metadata of the trick play data. The server 120 may include one piece of trick play data corresponding to a 2× trick play speed together with media data corresponding to a normal play speed. Each segment divided and generated based on time includes a "moof" box and an "mdat" box. The "moof" box includes metadata of a segment and the "mdat" box includes media content corresponding to the segment.

The client 130 describes location information of frames corresponding to a desired trick play speed by using a "Trak" box or a "Traf" box of the MP4 file, and requests for trick play data including the frames corresponding to a desired trick play speed.

The frame may be identified and transmitted by using an HTTP, though it is understood that another exemplary embodiment is not limited thereto and another protocol may be used.

Figure 11:
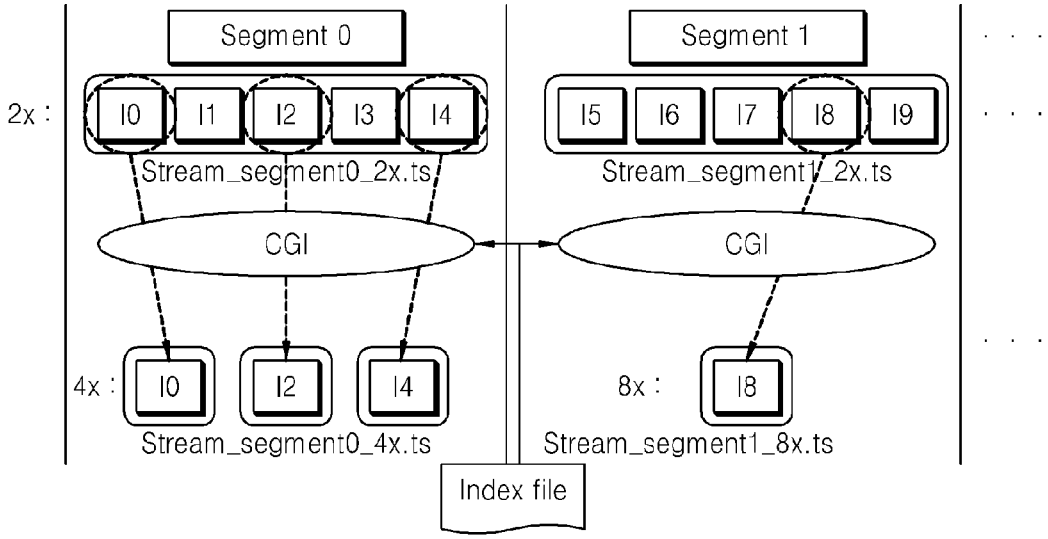
FIG. 11 is a diagram for describing a method of providing a trick play service by using virtual streams, according to an exemplary embodiment.

FIG. 11 is a diagram for describing a method of providing a trick play service by using virtual streams, according to an exemplary embodiment.

Referring to FIG. 11, in the method of providing a trick play service by using virtual streams, the server 120 includes one piece of trick play data corresponding to a 2× trick play speed, and an index file including locations and sizes of frames. Also, an MPD file may include information about the trick play data corresponding to a 2× trick play speed, which physically exists in the server 120, and information about at least one piece of trick play data corresponding to play speeds other than 2×, which virtually exists in the server 120.

The client 130 requests for one piece of the virtual trick play data corresponding to a desired trick play speed (e.g., Trick_segment0_4×.as) from among the at least one piece of virtual trick play data. The server 120 extracts trick play data corresponding to play speeds other than 2× from the trick play data corresponding to a 2× trick play speed by using a CGI program of the server 120 based on the index file including the locations and sizes of frames. The server 120 transmits the extracted trick play data to the client 130.

In the present exemplary embodiment, desired frames are extracted by using a CGI program based on an index file included in the server 120, though it is understood that another exemplary embodiment is not limited thereto, and another program may be used.

Figure 12A:
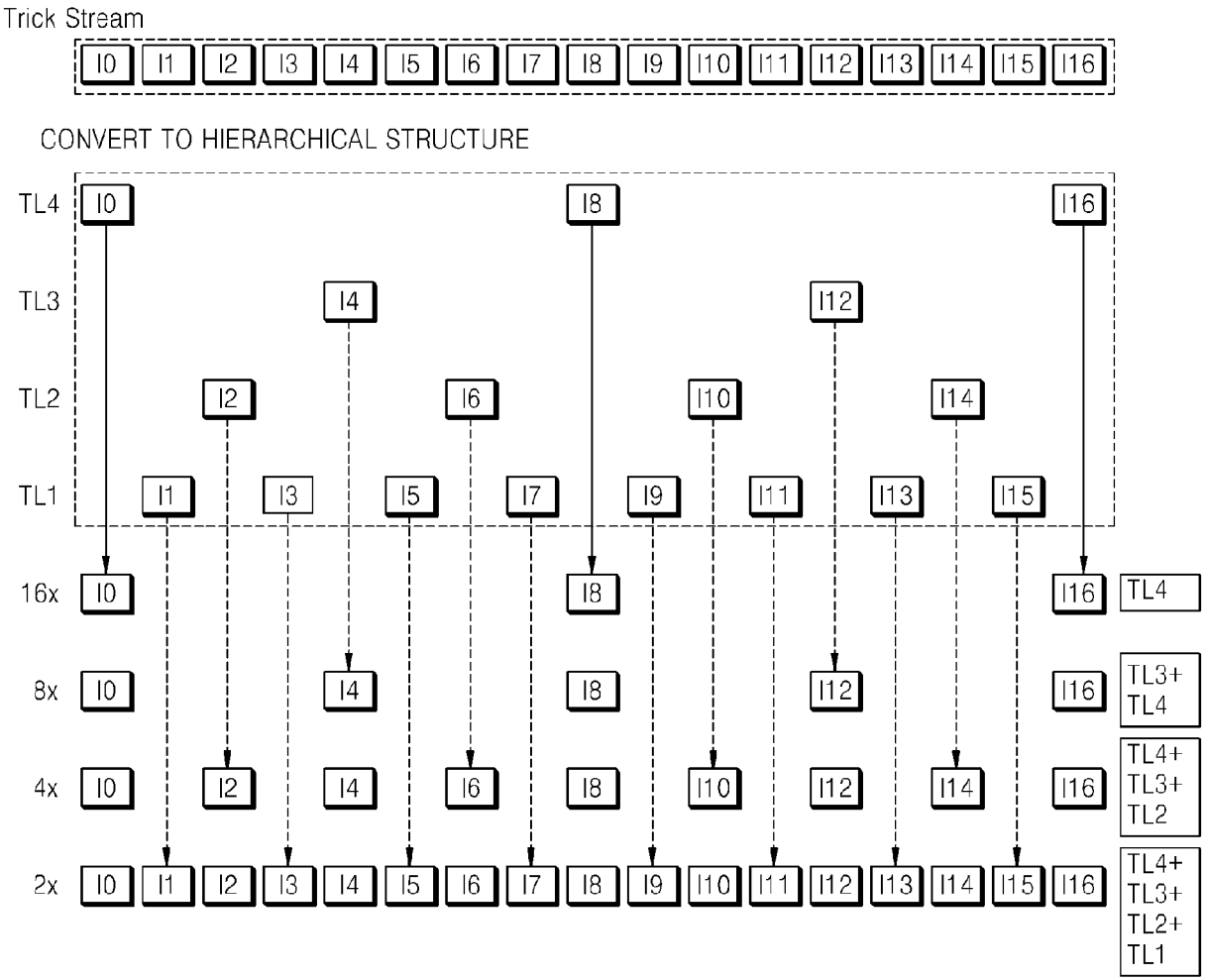
FIG. 12A is a diagram for describing a method of providing a trick play service by using multiple streams having a hierarchical structure and including intra-frames, according to an exemplary embodiment.

FIG. 12A is a diagram for describing a method of providing a trick play service by using multiple streams having a hierarchical structure and including intra-frames, according to an exemplary embodiment.

Referring to FIG. 12A, in the method of providing a trick play service by using multiple streams having a hierarchical structure, the number of pieces of trick play data is determined based on a maximum depth of trick levels (or a maximum number of trick levels). The maximum depth of trick levels is determined based on a maximum trick play speed. In exemplary Equation 1, $L_{max}$ is defined as the maximum depth of trick levels, and $R_{max}$ is defined as the maximum trick play speed:

$$L_{max}=\log_2(R_{max}) \quad \text{<Equation 1>}$$

For example, if the maximum trick play speed is 16× and the trick play service is provided in units of multiples of two, the maximum depth of trick levels is 4 and the number of pieces of the trick play data is 4. The four pieces of the trick play data correspond to trick levels TL1, TL2, TL3, and TL4.

The trick play data corresponding to each trick level corresponds to each trick play speed. However, frames included in the trick play data corresponding to each trick level do not repeatedly exist in another trick level.

For example, if the maximum trick play speed is 16×, the trick play service is provided in units of multiples of two, and the trick play data is encoded by using I-frames, the trick play data corresponding to the trick level TL4 includes I-frames I0, I8, and I16 corresponding to a 16× trick play speed, and the trick play data corresponding to the trick level TL3 includes I-frames I4 and I12 corresponding to a 8× trick play speed other than the I-frames corresponding to the 16× trick play speed. The trick play data corresponding to the trick level TL2 includes 1-frames 12, 16, 110, and 114 corresponding to a 4× trick play speed other than the I-frames corresponding to the 8× trick play speed. The trick play data corresponding to the trick level TL1 includes I-frames I1, I3, I5, I7, I9, I11, I13, and I15 corresponding to a 2× trick play speed other than the I-frames corresponding to the 4× trick play speed.

In exemplary Equation 2, $E_{1,n}$ defines a frame index of each trick level, n=0, 1, 2, . . . $N_1$, and $N_1$ indicates a total number of frames of the trick play data.

$$E_{l,n} = \begin{cases} 2^{l-1} \cdot n & \text{if } l = L_{max} \\ 2^{l-1} \cdot (2n+1) & \text{otherwise} \end{cases} \quad \text{⟨Equation 2⟩}$$

The client 130 requests for at least one piece of trick play data corresponding to each trick level in order to support a desired trick play speed.

For example, the client 130 requests for trick play data corresponding to the trick level TL4 in order to support a 16× trick play speed, requests for a plurality of pieces of trick play data corresponding to the trick levels TL3 and TL4 in order to support a 8× trick play speed, requests for a plurality of pieces of trick play data corresponding to the trick levels TL2, TL3, and TL4 in order to support a 4× trick play speed, and requests for a plurality of pieces of trick play data corresponding to the trick levels TL1, TL2, TL3, and TL4 in order to support a 2× trick play speed.

In exemplary Equation 3, frame_index(x) defines indices of all I-frames for supporting an x trick play speed:

(3)

$$\text{frame_index}(x) = \sum_{l=\log_2(x)}^{L_{max}} \sum_{n=0}^{N_l} E_{l,n} \quad \text{⟨Equation 3⟩}$$

For example, if the trick play data is encoded by using I-frames, all I-frames for supporting a 8× trick play speed have indices corresponding to the I-frames I0, I4, I8, I12, I16, etc. in the trick levels TL3 and TL4.

Figure 12B:
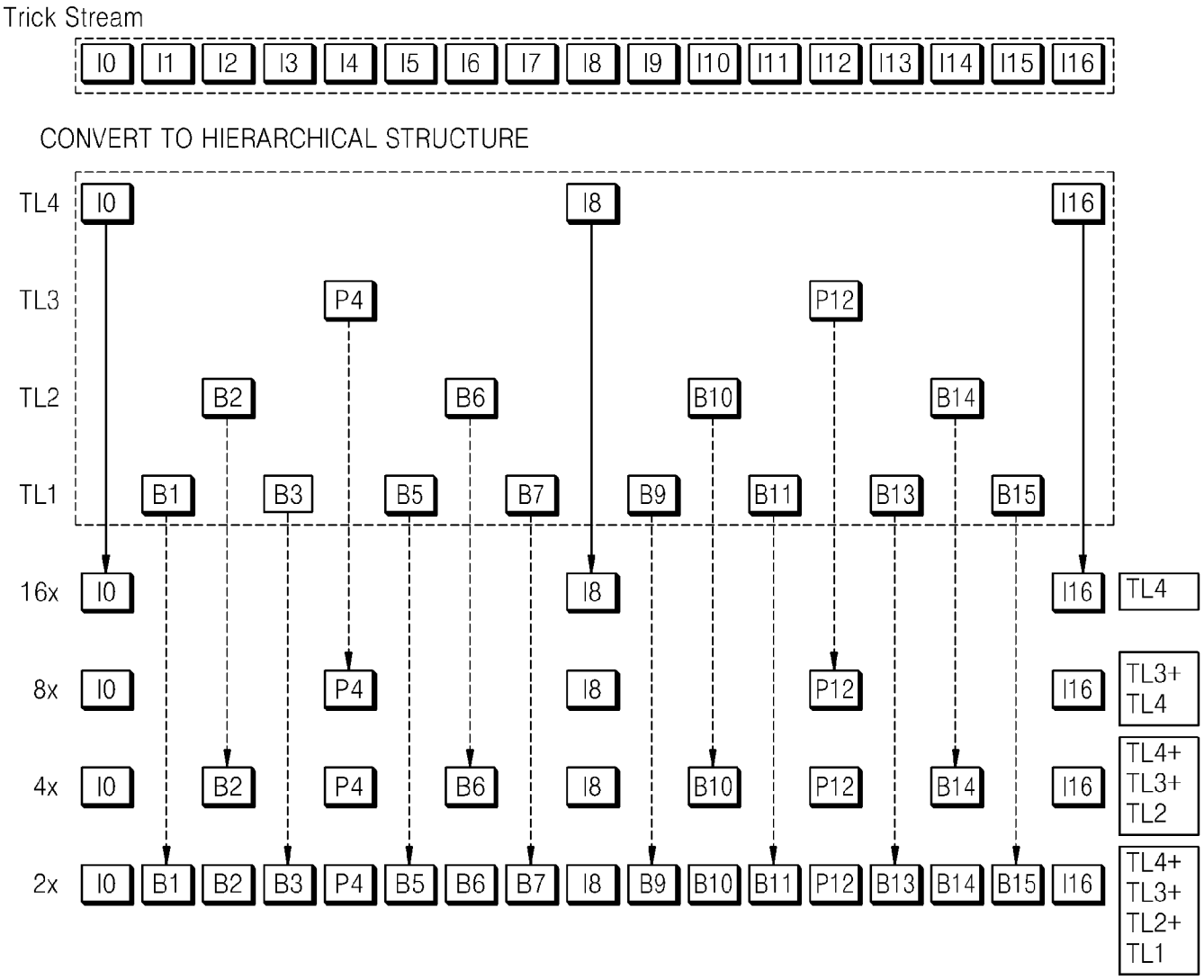
FIG. 12B is a diagram for describing a method of providing a trick play service by using multiple streams having a hierarchical structure and including intra- and inter-frames, according to an exemplary embodiment.

FIG. 12B is a diagram for describing a method of providing a trick play service by using multiple streams having a hierarchical structure and including intra- and inter-frames, according to an exemplary embodiment.

The encoder 110 may encode media content by using intra- and inter-frames to generate trick play data. The intra (I)-frames are frames encoded by using information of only corresponding frames. The inter-frames are frames encoded by using information of corresponding frames and other frames and include P-frames and B-frames. The encoder 110 encodes the trick play data at a play start point by using only I-frames. Referring to FIG. 12B, the trick play data includes I-frames, P-frames, and B-frames.

In the method of providing a trick play service by using multiple streams having a hierarchical structure according to an exemplary embodiment, the number of pieces of the trick play data is determined based on a maximum depth of trick levels (or a maximum number of trick levels). The maximum depth of trick levels is determined based on a maximum trick play speed. For example, in the above-described exemplary Equation 1, $L_{max}$ is defined as the maximum depth of trick levels, and $R_{max}$ is defined as the maximum trick play speed.

In FIG. 12B, if the maximum trick play speed is 16× and the trick play service is provided in units of multiples of two, the maximum depth of trick levels is 4 and the number of pieces of the trick play data is 4. The four pieces of the trick play data correspond to trick levels TL1, TL2, TL3, and TL4.

The trick play data corresponding to each trick level corresponds to each trick play speed. However, frames included in the trick play data corresponding to each trick level do not repeatedly exist in another trick level.

In FIG. 12B, if the maximum trick play speed is 16×, the trick play service is provided in units of multiples of two, and the trick play data is encoded by using I-frames, P-frames, and B-frames, the trick play data corresponding to the trick level TL4 includes I-frames I0, I8, and I16 corresponding to a 16× trick play speed, and the trick play data corresponding to the trick level TL3 includes P-frames P4 and P12 corresponding to a 8× trick play speed other than the frames corresponding to the 16× trick play speed. The trick play data corresponding to the trick level TL2 includes B-frames B2, B6, B10, and B14 corresponding to a 4× trick play speed other than the frames corresponding to the 8× trick play speed. The trick play data corresponding to the trick level TL1 includes B-frames B1, B3, B5, B7, B9, B11, B13, and B15 corresponding to a 2× trick play speed other than the frames corresponding to the 4× trick play speed.

In the above-described exemplary Equation 2, $E_{1,n}$ defines a frame index of each trick level, n=0, 1, 2, . . . $N_1$, and $N_1$ indicates a total number of frames of the trick play data.

The client 130 requests at least one piece of trick play data corresponding to each trick level in order to support a desired trick play speed.

For example, the client 130 requests trick play data corresponding to the trick level TL4 in order to support a 16× trick play speed, requests a plurality of pieces of trick play data corresponding to the trick levels TL3 and TL4 in order to support a 8× trick play speed, requests a plurality of pieces of trick play data corresponding to the trick levels TL2, TL3, and TL4 in order to support a 4× trick play speed, and requests a plurality of pieces of trick play data corresponding to the trick levels TL1, TL2, TL3, and TL4 in order to support a 2× trick play speed.

In the above-described exemplary Equation 3, frame_index(x) defines indices of all frames for supporting an x trick play speed.

If the trick play data is encoded by using I-frames, P-frames, and B-frames as illustrated in FIG. 12B, frames for supporting a 8× trick play speed have indices corresponding to the frames I0, P4, I8, P12, I16, etc., in the trick levels TL3 and TL4.

Figure 13:
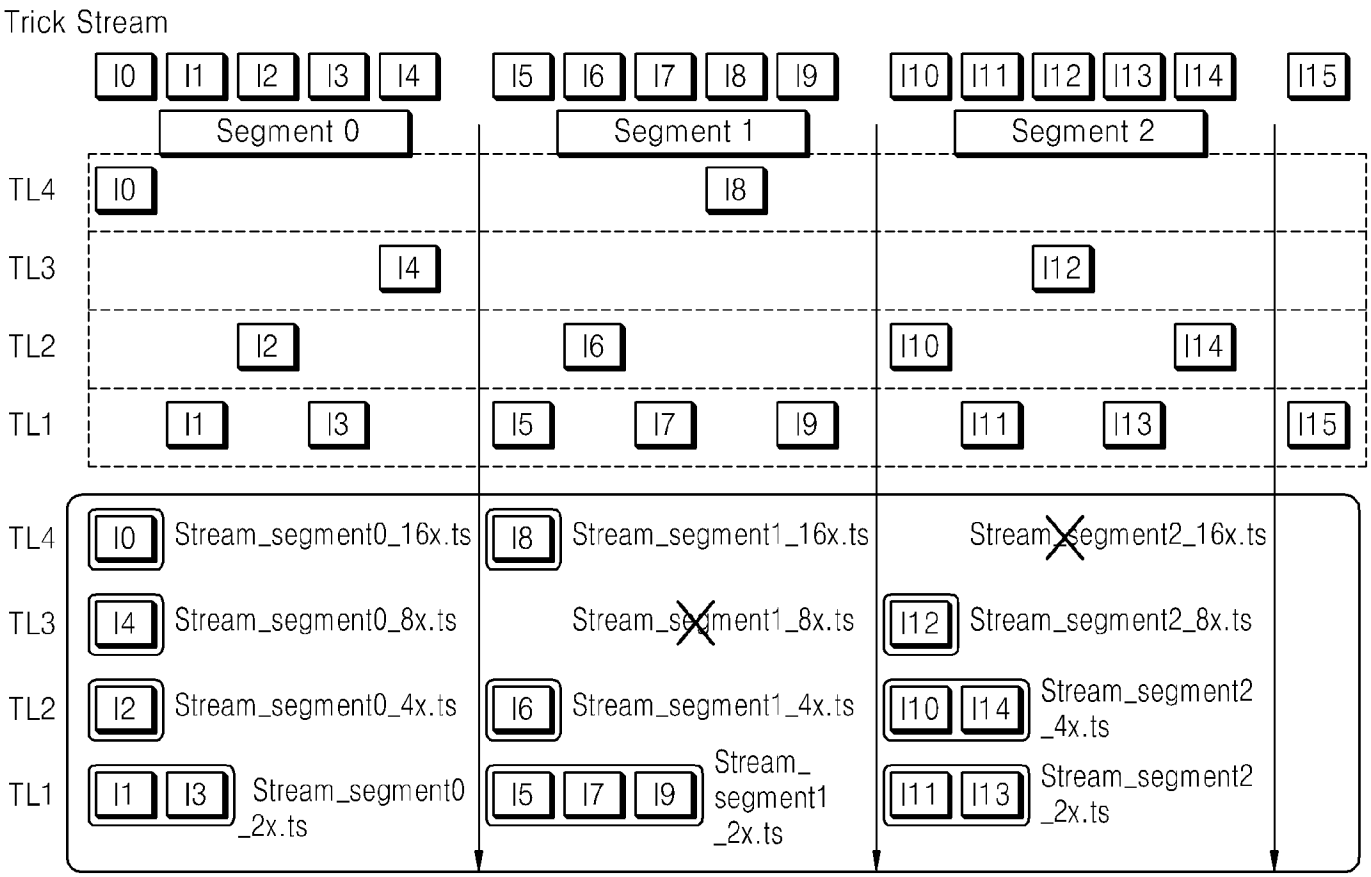
FIG. 13 is a diagram for describing a method of providing a trick play service by using multiple streams having a hierarchical structure at a server, according to an exemplary embodiment.

FIG. 13 is a diagram for describing a method of providing a trick play service by using multiple streams having a hierarchical structure at a server 120, according to an exemplary embodiment In the present exemplary embodiment, the server 120 includes trick play data corresponding to each trick level. The number of pieces of the trick play data is determined based on a maximum depth of trick levels (or a maximum number of trick levels). As described above with reference to FIG. 12A, the maximum depth of trick levels is determined based on a maximum trick play speed according to exemplary Equation 1.

For example, referring to FIG. 13, if the maximum trick play speed is 16×, the trick play service is provided in units of multiples of two, and the trick play data is encoded by using I-frames, a segment 0 includes a Stream_segment0_16×.ts file including an I-frame I0 corresponding to a trick level TL4, a Stream_segment0_8×.ts file including an I-frame 14 corresponding to a trick level TL3, a Stream_segment0_4×.ts file including an I-frame I2 corresponding to a trick level TL2, and a Stream_segment0_2×.ts file including I-frames I1 and I3 corresponding to a trick level TL1.

Also, a segment 1 includes a Stream_segment1_16×.ts file including an I-frame I8 corresponding to the trick level TL4, a Stream_segment1_4×.ts file including an I-frame I6 corresponding to the trick level TL2, and a Stream_segment1_2×.ts file including I-frames I5, I7, and I9 corresponding to the trick level TL1. Since no I-frame corresponds to the trick level TL3, a Stream_segment1_8×.ts file does not exist.

Furthermore, a segment 2 includes a Stream_segment2_8×.ts file including an I-frame 112 corresponding to the trick level TL3, a Stream_segment2_4×.ts file including I-frames I10 and I14 corresponding to the trick level TL2, and a Stream_segment2_2×.ts file including I-frames I11 and I13 corresponding to the trick level TL1. Since no I-frame corresponds to the trick level TL4, a Stream_segment2_16×.ts file does not exist.

Figure 14:
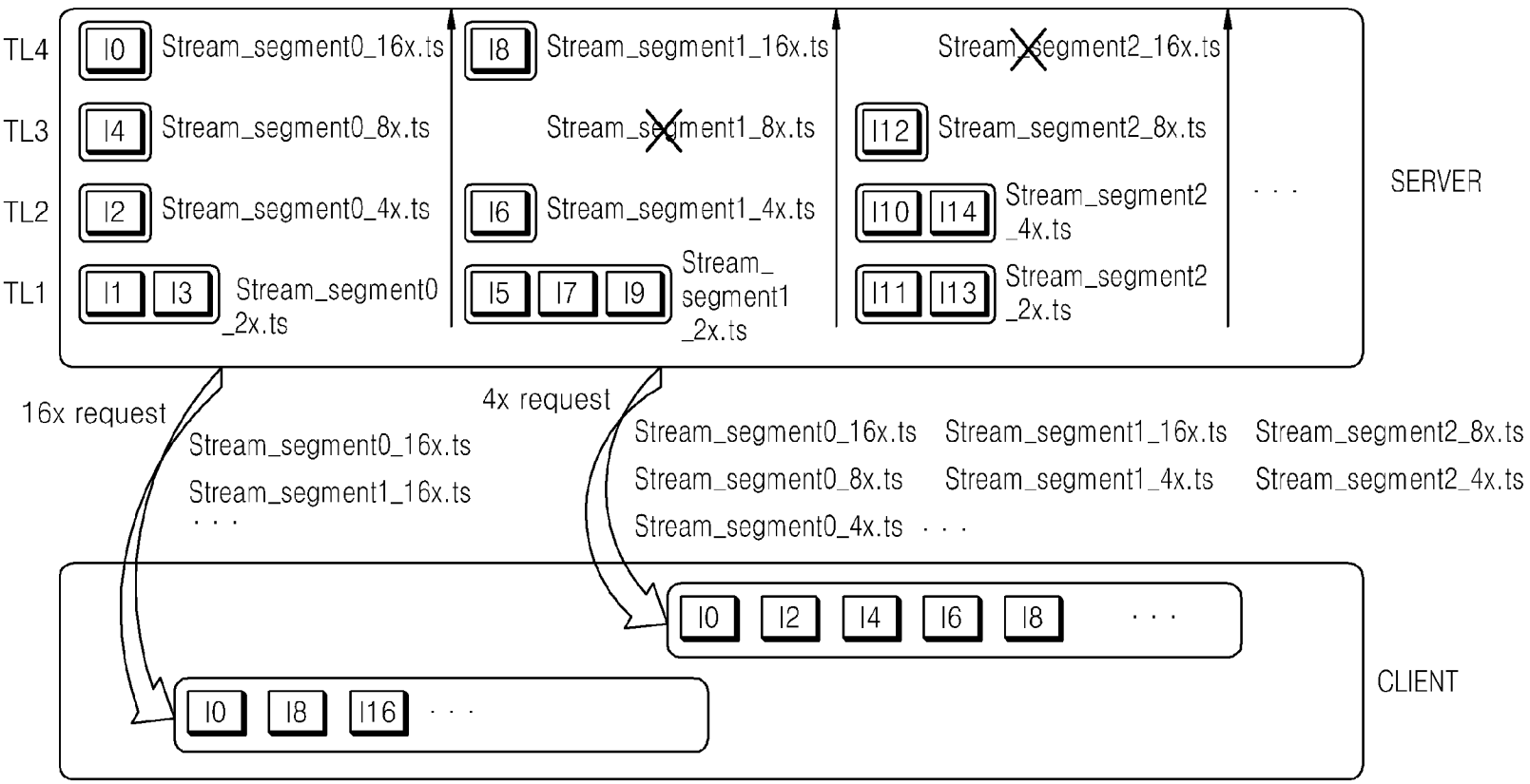
FIG. 14 is a diagram for describing a method of providing a trick play service by using multiple streams having a hierarchical structure at a client, according to an exemplary embodiment.

FIG. 14 is a diagram for describing a method of providing a trick play service by using multiple streams having a hierarchical structure at a client 130, according to an exemplary embodiment.

In the present exemplary embodiment, the client 130 requests at least one piece of trick play data corresponding to each trick level in order to support a desired trick play speed.

For example, referring to FIG. 14, the client 130 requests trick play data corresponding to a trick level TL4 in order to support a 16× trick play speed. The client 130 requests the Stream_segment0_16×.ts file, the Stream_segment1_16×.ts file, etc.

The client 130 requests a plurality of pieces of trick play data corresponding to trick levels TL2, TL3, and TL4 in order to support a 4× trick play speed. The client 130 requests the server 120 for files corresponding to each segment in the trick levels TL2, TL3, and TL4 according to a flow of time. For example, the Stream_segment0_16×.ts, Stream_segment0_8×.ts, and stream_segment 0_4×.ts files are requested in the segment 0, and the Stream_segment1_16×.ts, Stream_segment1_8×.ts, and stream_segment 1_4×.ts files are requested in the segment 1.

The client 130 realigns at least one piece of trick play data corresponding to each trick level in an order of reproduction time. That is, the client 130 realigns I-frames included in the received segment files in order.

Figure 15:
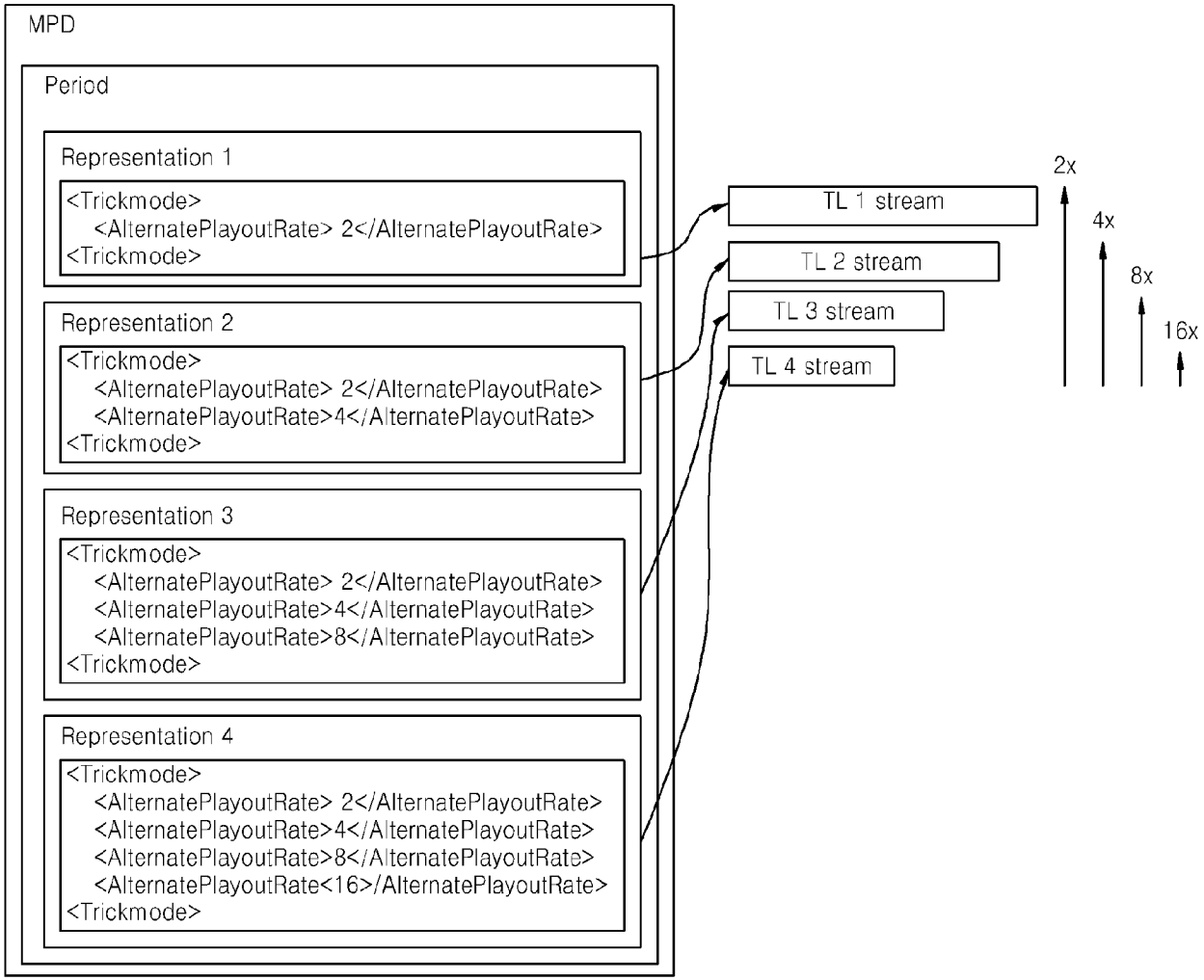

FIGS. 15 and 16A are diagrams showing MPDs of a method of providing a trick play service by using multiple streams having a hierarchical structure, according to an exemplary embodiment.

In the present exemplary embodiment, a trick level corresponding to trick play data may be defined by at least one "AlternatePlayoutRate" attribute, though it is understood that the name of the attribute may vary.

Referring to FIGS. 15 and 16A, a trick level TL4 is defined by using four "AlternatePlayoutRate" attributes such as "<AlternatePlayoutRate>2 </AlternatePlayoutRate>, <AlternatePlayoutRate>4</AlternatePlayoutRate>, <AlternatePlayoutRate>8</AlternatePlayoutRate>, and <AlternatePlayoutRate>16</AlternatePlayoutRate>". A trick level TL2 is defined by using two "AlternatePlayoutRate" attributes such as "<AlternatePlayoutRate>2</AlternatePlayoutRate> and <AlternatePlayoutRate>4</AlternatePlayoutRate>".

While in the present exemplary embodiment, a trick level is identified by using at least one "AlternatePlayoutRate"

attribute, it is understood that another exemplary embodiment is not limited thereto and another identification method may be used.

Figure 16B:
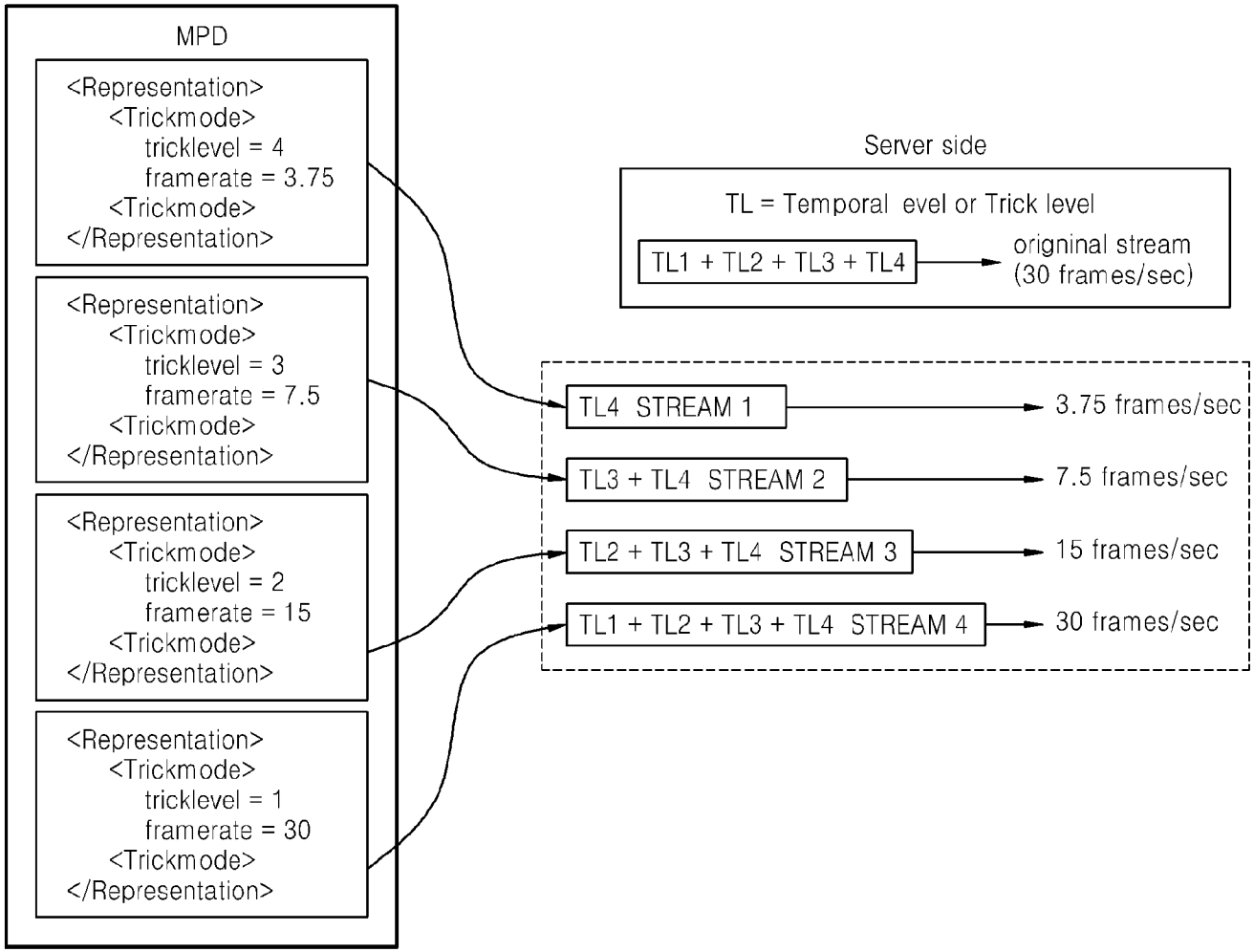
FIG. 16B is a diagram showing an MPD of a method of providing a trick play service by using multiple streams having a hierarchical structure for identifying a trick level and a frame rate, according to an exemplary embodiment.

FIG. 16B is a diagram showing an MPD of a method of providing a trick play service by using multiple streams having a hierarchical structure for identifying a trick level and a frame rate, according to an exemplary embodiment.

An encoder 110 according to an exemplary embodiment may encode media content by using intra- and inter-frames to generate trick play data. The intra (I)-frames are frames encoded by using information of only corresponding frames. The inter-frames are frames encoded by using information of corresponding frames and other frames and include P-frames and B-frames. Furthermore, the encoder 110 encodes the trick play data at a play start point by using only I-frames. Referring to FIG. 16B, the trick play data includes I-frames, P-frames, and B-frames.

In the method of providing a trick play service by using multiple streams having a hierarchical structure, the number of pieces of the trick play data is determined based on a maximum number of trick levels. In the present exemplary embodiment, the maximum number of trick levels is 4 and the number of pieces of the trick play data is 4. The four pieces of the trick play data correspond to trick levels TL1, TL2, TL3, and TL4. A trick level of the trick play data may be defined by using a "tricklevel" attribute, though it is understood that the name of the attribute may vary.

The trick play data corresponding to each trick level defines a trick play speed by using a frame rate. The trick play speed of the trick play data may be defined by using a "frame rate" attribute, though it is understood that the name of the attribute may vary. Frames included in the trick play data corresponding to each trick level do not repeatedly exist in another trick level.

In the present exemplary embodiment, the encoder 110 defines the trick play data including 30 frames per second (fps) by using four trick levels TL1, TL2, TL3, and TL4.

The trick play data corresponding to the trick level TL4 includes frames corresponding to a trick play speed of 3.75 frames per second (fps), and the trick play data corresponding to the trick level TL3 includes frames corresponding to a trick play speed of 7.5 fps other than the frames corresponding to the trick play speed of 3.75 fps. The trick play data corresponding to the trick level TL2 includes frames corresponding to a trick play speed of 15 fps other than the frames corresponding to the trick play speed of 7.5 fps. The trick play data corresponding to the trick level TL1 includes frames corresponding to a trick play speed of 30 fps other than the frames corresponding to the trick play speed of 15 fps. The frames of the trick play data are stored in the server 120 in an order from the trick level TL4 to the trick level TL1, and a desired trick level may be accessed by using index information indicating the trick level.

The client 130 requests at least one piece of trick play data corresponding to each trick level in order to support a desired trick play speed.

For example, the client, 130 requests trick play data corresponding to the trick level TL4 in order to support a trick play speed of 3.75 fps, requests a plurality of pieces of trick play data corresponding to the trick levels TL3 and TL4 in order to support a trick play speed of 7.5 fps, requests a plurality of pieces of trick play data corresponding to the trick levels TL2, TL3, and TL4 in order to support a trick play speed of 15 fps, and requests a plurality of pieces of trick play data corresponding to the trick levels TL1, TL2, TL3, and TL4 in order to support a trick play speed of 30 fps.

According to another exemplary embodiment, for example, location information of trick play data corresponding to each trick level may be added in the form of a box of an MP4 file by using information about a trick level, and a frame rate, though it is understood that the name of the box may differ.

Figure 17:
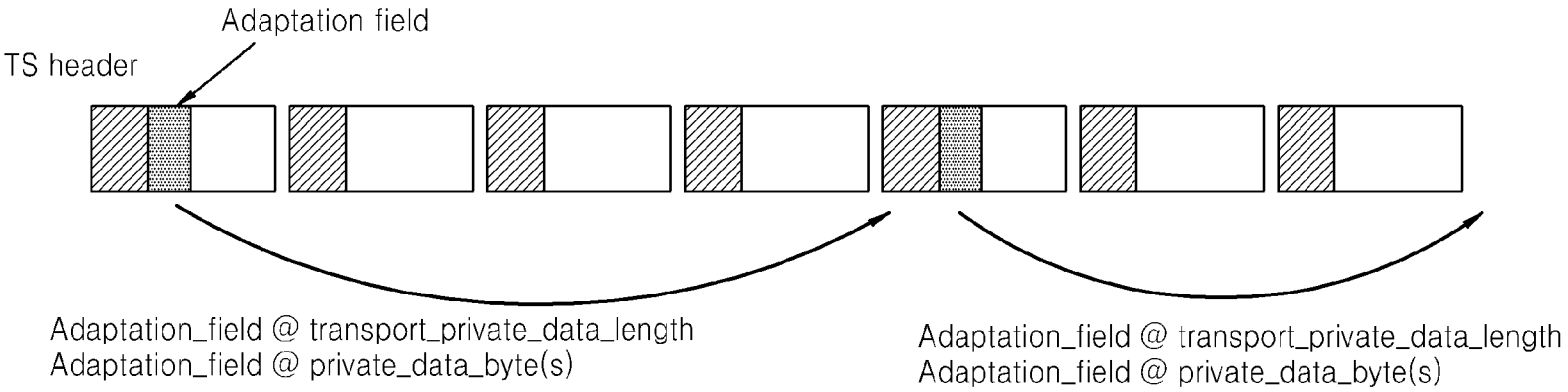
FIG. 17 is a structural diagram of a transport stream (TS) packet for detecting an I-frame from a Moving Picture Experts Group (MPEG) TS, according to an exemplary embodiment.

FIG. 17 is a structural diagram of a transport stream (TS) packet for detecting an I-frame from an MPEG TS, according to an exemplary embodiment.

Referring to FIG. 17, an "Adaptation field" is a portion of a TS header and is an optional field for inputting TS-related additional information. The "Adaptation field" has a plurality of parameters and includes a "private-data-byte" field that may be arbitrarily used by a user. A "transport-private-data-length" parameter indicates the size of the "private-data-byte" field included in the "Adaptation field." The "private-data-byte" field is a space for storing data arbitrarily defined by the user. A client 130 according to an exemplary embodiment may calculate a start point of a subsequent I-frame in the MPEG TS by using the "transport-private-data-length" parameter and the "private-data-byte" field.

The start point of a subsequent I-frame in the MPEG TS may be calculated when the client 130 realigns I-frames included in received segment files in order according to a method of providing a trick play service by using multiple streams having a hierarchical structure, though it is understood that another exemplary embodiment is not limited thereto, and the start point of a subsequent I-frame may be calculated for another purpose.

FIG. 18 is a diagram for describing a method of forming a TS packet for detecting an I-frame from an MPEG TS, according to an exemplary embodiment.

Referring to FIG. 18, an "Adaptation field" includes a "private-data-byte" field for inputting "private data." An encoder 110 according to an exemplary embodiment defines the length of the "private-data-byte" field and inputs the length as a "transport-private-data-length" parameter. The encoder 110 records the "private data" in the "private-data-byte" field by the "transport-private-data-length." The "private-data-byte" field has a numerical value in the form of an "unsigned integer." The value of the "private-data-byte" field is an offset value regarding a start point of a TS packet having a subsequent I-frame with respect to a current TS packet. If a plurality of I-frames is included in one TS, the "Adaptation field" exists at a start point of each I-frame.

Figure 19:
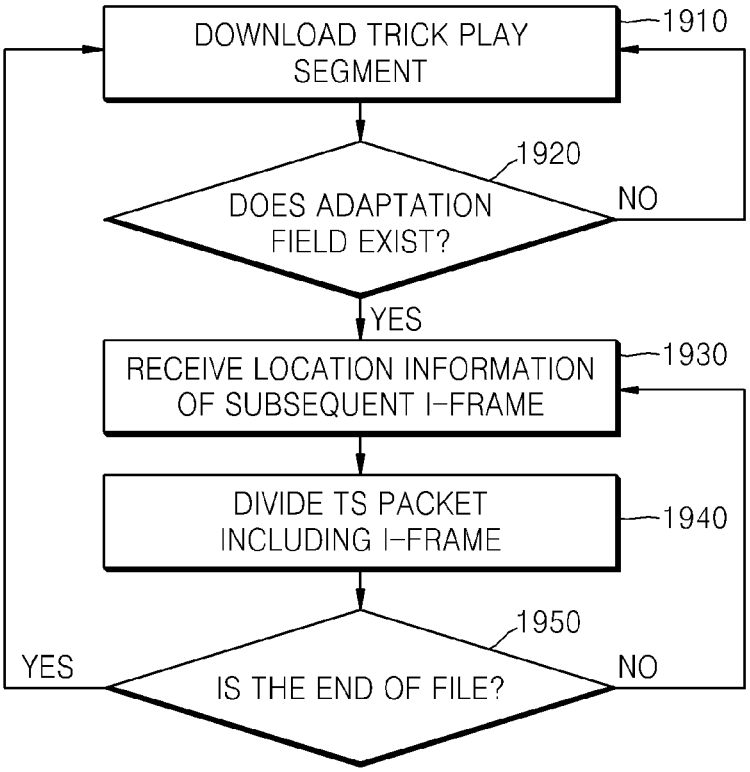
FIG. 19 is a flowchart of a method of detecting an I-frame from an MPEG TS, according to an exemplary embodiment.

FIG. 19 is a flowchart of a method of detecting an I-frame from an MPEG TS, according to an exemplary embodiment.

Referring to FIG. 19, in operation 1910, a client 130 downloads a trick play segment from a server 120.

In operation 1920, if a subsequent I-frame is to be detected from the trick play segment, an "Adaptation field" of the MPEG TS is parsed.

In operation 1930, an offset value of the subsequent I-frame is extracted by using a "private-data-byte" field of the "Adaptation field." For example, if the offset value is 2462, 0x99E obtained by changing the value 2462 into a 16-bit value is calculated. Since the size of the "unsigned integer" is 4 bytes, the value of a "transport-private-data-length" parameter is registered as 4. 0x99E is converted into "0x0 00x00 0x09 0x9E," i.e., a 4-byte integer. The converted value is input to the "private-data-byte" field. Moreover, according to a method of extracting the offset value from the "private-data-byte" field, if the private-data-byte is declared as pdb[4], the offset value may be calculated as (int) (pdb[3]<<24|pdb[2]<<16|pdb[1]<<8|pdb[0]).

In operation 1940, a TS file, i.e., a segment file, is divided by the offset value of the subsequent I-frame.

In operation 1950, it is determined whether the segment file is the last frame. If the segment file is not the last frame, the method returns to operation 1930 and a subsequent I-frame is extracted. If the segment file is the last frame, the method returns to operation 1910 and the client 130 downloads a subsequent trick play segment from the server 120.

Figure 20:
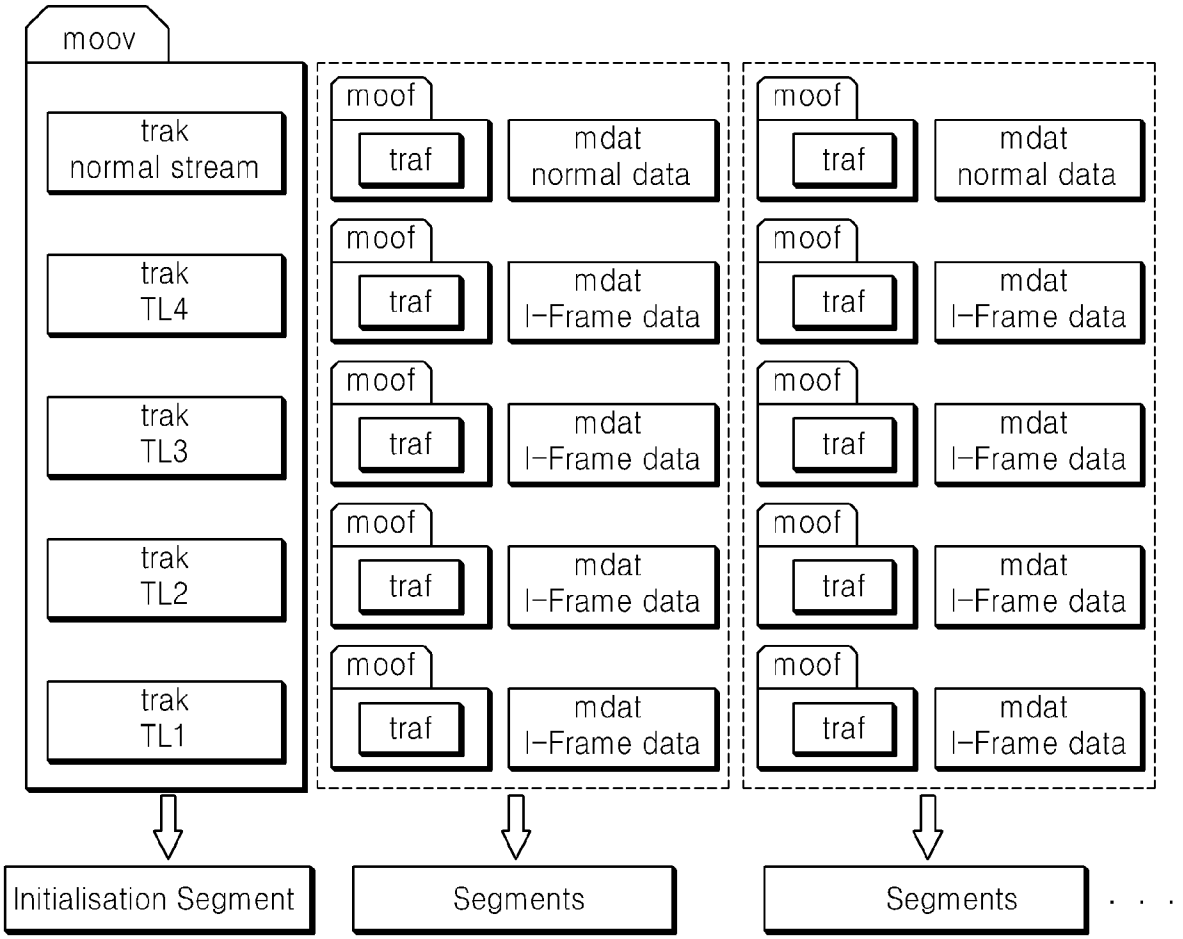
FIG. 20 is a structural diagram of an MP4 file for detecting an I-frame from an MPEG TS, according to an exemplary embodiment.

FIG. 20 is a structural diagram of an MP4 file for detecting an I-frame from an MPEG TS, according to an exemplary embodiment.

Referring to FIG. 20, in the MP4 file, each piece of trick play data corresponds to a track of the MP4 file. A "trak" box of each track includes metadata of the trick play data. The number of pieces of the trick play data may be determined based on a maximum trick play speed according to exemplary Equation 1 as described above with reference to FIG. 11.

A server 120 according to an exemplary embodiment includes at least one piece of trick play data corresponding to each trick level, together with normal speed play data. The trick play data corresponding to each trick level includes at least one segment divided and generated based on time. Each segment includes a "moof" box and an "mdat" box. The "moof" box includes metadata of a segment and the "mdat" box includes media content corresponding to the segment.

Location information of an I-frame corresponding to a desired trick play speed may be obtained by using a "Trak" box or a "Traf" box of the MP4 file.

When I-frames included in received segment files are realigned in order, a client 130 according to an exemplary embodiment may obtain the location information of a subsequent I-frame by using the "Trak" box or the "Traf" box.

Figure 21:
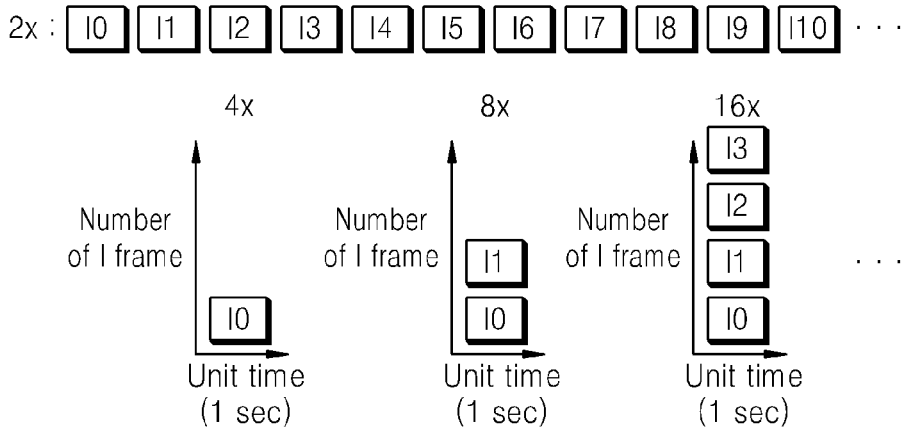
FIG. 21 is a conceptual diagram for describing a method of providing a trick play service by varying a frame rate, according to an exemplary embodiment.

FIG. 21 is a conceptual diagram for describing a method of providing a trick play service by varying a frame rate, according to an exemplary embodiment.

In the method of providing a trick play service by varying a frame rate, a server 120 includes one piece of trick play data corresponding to a default play speed. For example, if a maximum trick play speed is 16× and the trick play service is provided in units of multiples of two, the server 120 includes one piece of trick play data corresponding to a 2× trick play speed. Referring to FIG. 21, the server 120 includes one piece of trick play data corresponding to a 2× trick play speed, which is formed by extracting one frame in every unit time of two seconds. Play speeds other than 2× may be supported by varying a frame rate of the trick play data corresponding to a 2× trick play speed at the client 130.

The client 130 may support 2× trick play by playing one frame in a unit time, may support 4× trick play by playing two frames in the unit time, may support 8× trick play by playing four frames in the unit time, and may support 16× trick play by playing eight frames in the unit time.

Furthermore, the method of providing a trick play service by varying a frame rate may be used together with at least one of the above-described methods of providing a trick play service by using multiple streams, method of providing a trick play service by using a frame range query, method of providing a trick play service by using virtual streams, and method of providing a trick play service by using multiple streams having a hierarchical structure, so as to support a variable trick play speed. For example, where the method of providing a trick play service by using multiple streams and the method of providing a trick play service by varying a frame rate are used together, a client 130 may receive from the server 120 one piece of trick play data corresponding to a certain trick play speed (e.g., 8×), and then may support a variable trick play speed that is different from the certain trick play speed by varying a frame rate.

Figure 22:
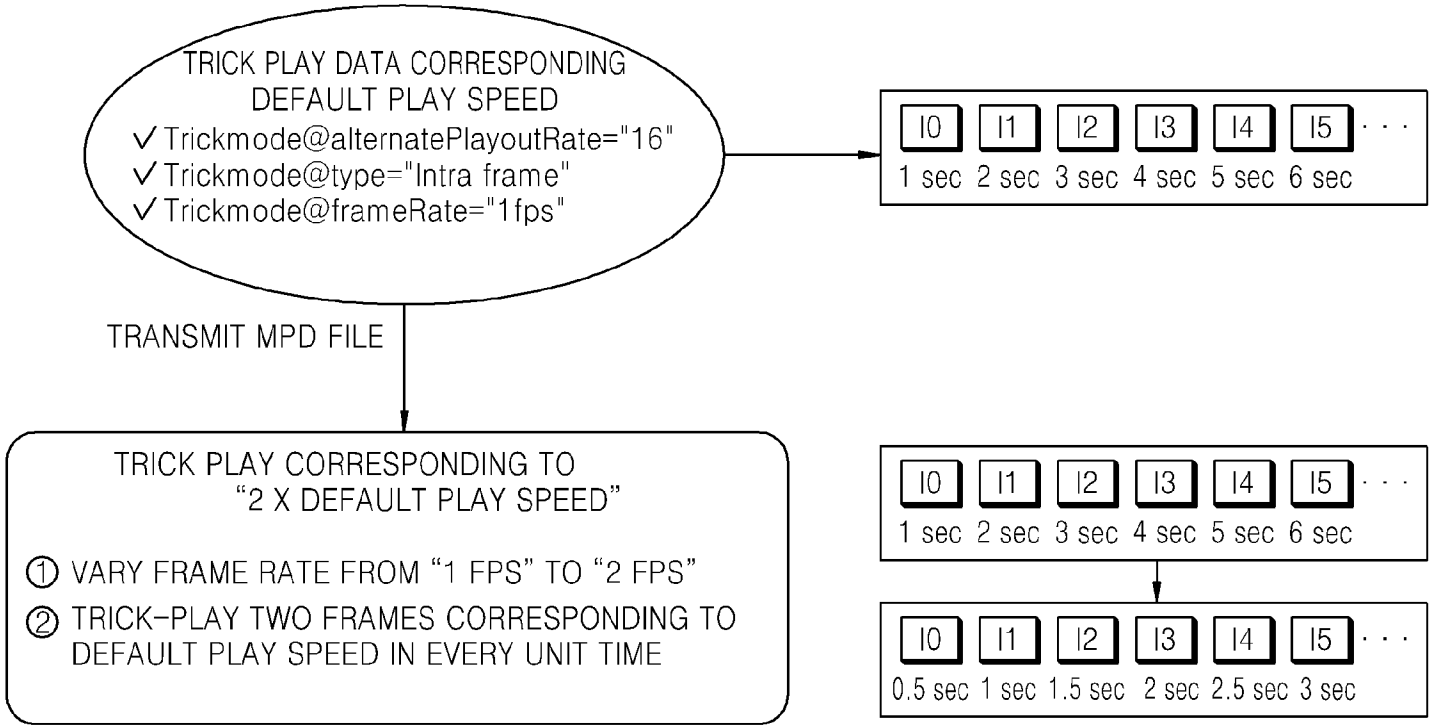
FIG. 22 is a diagram for describing a method of providing a trick play service by varying a frame rate at a server and a client, according to an exemplary embodiment.

FIG. 22 is a diagram for describing a method of providing a trick play service by varying a frame rate at a server 120 and a client 130 illustrated in FIG. 1, according to an exemplary embodiment.

Referring to FIG. 22, the server 120 includes a piece of trick play data corresponding to a default play speed, and an MPD file including information about the trick play data. For example, if a maximum trick play speed is 16× and the trick play service is provided in units of multiples of two, the server 120 includes a piece of trick play data corresponding to a 2× trick play speed.

The MPD file includes information about a frame rate, a frame type, and the maximum trick play speed. The frame rate indicates the number of frames to be played per second at the client 130. The frame type indicates whether the trick play data includes only intra-frames, or intra- and inter-frames. In FIG. 22, an "alternatePlayoutRate" attribute describes the maximum trick play speed as 16, a "type" attribute identifies that the trick play data includes only I-frames, and a "frameRate" attribute is described as "1 fps." A schema of the MPD file will be described in detail below with reference to FIGS. 23 and 24.

The client 130 requests a piece of trick play data corresponding to a 2× trick play speed based on the MPD file including information about the trick play data.

If the client 130 desires 2× trick play, one frame corresponding to 2× is played in every unit time based on the frame rate described in the MPD file. The client 130 may support play speeds other than 2× by varying the frame rate.

For example, if the client 130 desires 4× trick play, the frame rate described in the MPD file is varied from "1 fps" to "2 fps" and two frames corresponding to 2× are played in every unit time.

If the client 130 desires 8× trick play, the frame rate described in the MPD file is varied from "1 fps" to "4 fps" and four frames corresponding to 2× are played in every unit time.

If the client 130 desires 16× trick play, the frame rate described in the MPD file is varied from "1 fps" to "8 fps" and eight frames corresponding to 2× are played in every unit time.

Figure 23:
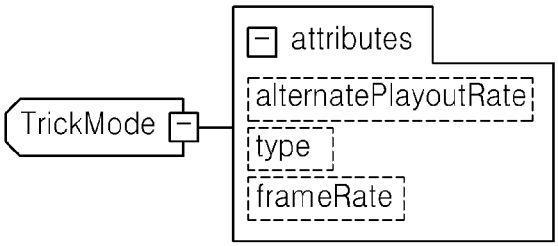
FIG. 23 is a schema of an MPD of a method of providing a trick play service by varying a frame rate, according to an exemplary embodiment.

FIG. 23 is a schema of an MPD of a method of providing a trick play service by varying a frame rate, according to an exemplary embodiment.

Referring to FIG. 23, in the method of providing a trick play service by varying a frame rate, an MPD includes a "TrickMode" tag. The "TrickMode" tag includes an "alternatePlayoutRate" attribute, a "type" attribute, and a "frameRate" attribute.

The "alternatePlayoutRate" attribute defines a maximum trick play speed. The "type" attribute defines whether trick play data includes only intra-frames, or intra- and inter-frames. The "frameRate" attribute defines the number of frames to be played per second at a client 130.

FIG. 24 is a diagram showing an MPD of a method of providing a trick play service by varying a frame rate, according to an exemplary embodiment.

Referring to FIG. 24, an "alternatePlayoutRate" attribute has a value 16 and indicates that a maximum trick play speed is 16×. A "type" attribute has a value "Intra" from among values "Intra" and "Intra or Inter", and indicates that trick play data includes only I-frames. A "frameRate" attribute has a value 1 and indicates that the number of frames to be played per second is one.

Figure 25:
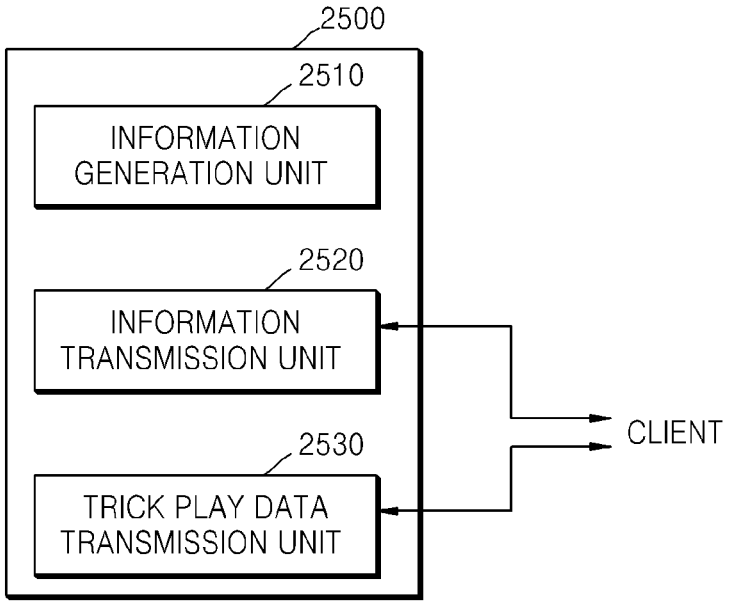
FIG. 25 is a block diagram of a server according to an exemplary embodiment.

FIG. 25 is a block diagram of a server 2500 according to an exemplary embodiment.

Referring to FIG. 25, the server 2500 includes an information generation unit 2510, an information transmission unit 2520, and a trick play data transmission unit 2530.

The information generation unit 2510 generates an MPD file including information about at least one piece of trick play data. The MPD file includes type information for identifying that the trick play data is data for trick play.

In a method of providing a trick play service by using multiple streams according to an exemplary embodiment, the number of pieces of trick play data is determined based on a maximum trick play speed, and the trick play data includes at least one of a plurality of segments generated by encoding media content at a predetermined bit rate into frames corresponding to a predetermined trick play speed and dividing the encoded frames based on time. In this case, the MPD file includes information about the predetermined trick play speed, and URLs of the segments that are divided and generated based on time and are to be played at the predetermined trick play speed.

In a method of providing a trick play service by using virtual streams according to an exemplary embodiment, the MPD file includes information about trick play data corresponding to a 2× trick play speed, which physically exists in the server 2500, and information about at least one piece of trick play data corresponding to play speeds other than 2×, which virtually exists in the server 2500. In this case, the server 2500 may further include an extraction unit (not shown) which extracts the trick play data corresponding to play speeds other than 2× from the trick play data corresponding to a 2× trick play speed upon a request of a client based on the MPD file. The extraction unit may be realized by using a CGI program based on an index file including locations and sizes of frames.

In a method of providing a trick play service by using a frame range query according to an exemplary embodiment, at least one piece of trick play data includes at least one of a plurality of segments generated by encoding media content at a predetermined bit rate into frames corresponding to a predetermined trick play speed (e.g., 2×) and dividing the encoded frames based on time. In this case, the information generation unit 2510 may further generate an index file including locations and sizes of frames. Furthermore, in this case, the MPD file includes information about trick play data corresponding to a predetermined trick play speed, and a URL of the index file. The server 2500 may further include an extraction unit (not shown) which extracts the trick play data corresponding to play speeds other than 2× from the trick play data corresponding to a 2× trick play speed upon a request of the client that received the MPD file and the index file. The extraction unit may be realized by using an HTTP server capable of processing an HTTP range response.

In a method of providing a trick play service by using multiple streams having a hierarchical structure according to an exemplary embodiment, the number of pieces of trick play data is determined based on a maximum trick play speed, and the trick play data includes at least one of a plurality of segments generated by encoding media content at a predetermined bit rate into frames corresponding to a predetermined trick level and dividing the encoded frames based on time. The predetermined trick level forms a hierarchical structure and is one of at least one trick level based on a maximum depth of trick levels. The maximum depth of trick levels is determined based on the maximum trick play speed. Moreover, frames included in the predetermined trick level do not repeatedly exist in another trick level. In this case, the MPD file includes information about the predetermined trick level, and URLs of a plurality of segments divided and generated based on time and corresponding to the predetermined trick level. The predetermined trick level is described to include information about at least one trick play speed using a plurality of segments divided and generated based on time.

In a method of providing a trick play service by varying a frame rate according to an exemplary embodiment, at least one piece of trick play data includes at least one of a plurality of segment generated by encoding media content at a predetermined bit rate into frames corresponding to a predetermined trick play speed, and dividing the encoded frames based on time. In this case, the MPD file includes information about at least one of a frame rate, a frame type, and a maximum trick play speed. The frame rate indicates the number of frames to be played per second at the client. The frame type indicates whether the trick play data includes only intra-frames, or intra- and inter-frames.

The information transmission unit 2520 transmits the MPD file to the client.

In a method of providing a trick play service by using a frame range query according to an exemplary embodiment, the information transmission unit 2520 may further transmit the index file to the client.

The trick play data transmission unit 2530 transmits the trick play data to the client upon a request of the client based on the MPD file.

Figure 26:
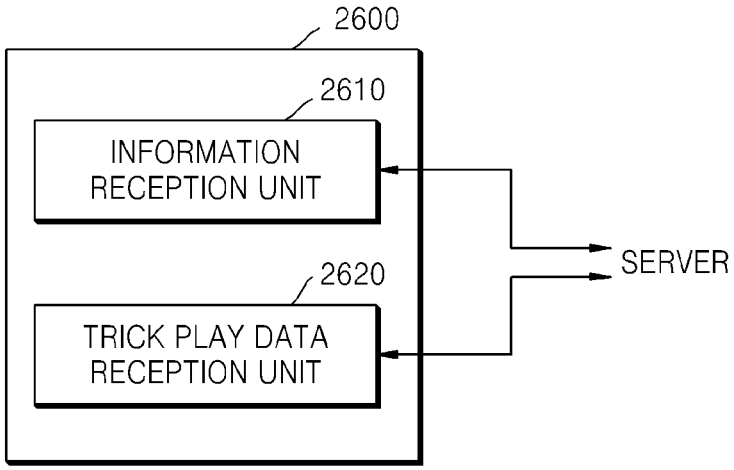
FIG. 26 is a block diagram of a client according to an exemplary embodiment.

FIG. 26 is a block diagram of a client 2600 according to an exemplary embodiment.

Referring to FIG. 26, the client 2600 includes an information reception unit 2610 and a trick play data reception unit 2620.

The information reception unit 2610 receives from a server an MPD file including information about at least one piece of trick play data.

The trick play data reception unit 2620 receives the trick play data from the server based on the MPD file.

In a method of providing a trick play service by using multiple streams having a hierarchical structure according to an exemplary embodiment, the trick play data reception unit 2620 receives a plurality of segments divided and generated based on time and corresponding to at least one trick level in order to support a predetermined trick play speed based on the request of the client. In this case, the client 2600 may further include a realignment unit (not shown) which realigns the trick play data in an order of play time.

In a method of providing a trick play service by varying a frame rate according to an exemplary embodiment, the client 2600 may further include a play unit (not shown) which reproduces the trick play data based on a frame rate.

In a method of providing a trick play service by using a frame range query according to an exemplary embodiment, the information reception unit 2610 may further receive an index file from the server with reference to a URL of the index file, which is included in the MPD file. In this case, the trick play data reception unit 2620 may receive from the server the trick play data including I-frames corresponding to a desired trick play speed based on the index file. The trick play data reception unit 2620 may be realized by using an HTTP client capable of processing an HTTP range query.

While exemplary embodiments have been particularly shown and described above, it will be understood by those of ordinary skill in the art that various changes in form and details may be made therein without departing from the spirit and scope of the present inventive concept as defined by the following claims.

For example, the server 2500 and the client 2600 can include a bus coupled to units of each of the devices shown in FIGS. 25 and 26, and at least one processor connected to the bus. In addition, a memory coupled to at least one processor for performing commands as described above can be included and connected to the bus to store the commands and received messages or generated messages.

An exemplary embodiment can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks and, optical data storage devices. The computer readable recording medium can also be distributed over network coupled computer systems so that the computer readable code is stored and executed in a distributed fashion.

What is claimed is:

[1. A method of providing a trick play service at a server, the method comprising:

generating a media presentation description (MPD) file comprising information about at least one piece of trick play data;

transmitting the MPD file to a client; and transmitting the at least one piece of trick play data to the client in response to a request by the client based on the MPD file, wherein a number of the at least one piece of trick play data is determined based on a maximum trick play speed, and wherein the at least one piece of trick play data comprises one or more segments generated by encoding media content at a predetermined bit rate into frames corresponding to a predetermined trick play speed and dividing the encoded frames based on time.]

[2. The method of claim 1, wherein the MPD file comprises type information identifying that the at least one piece of trick play data is data for trick play.]

[3. The method of claim 1, wherein the MPD file comprises information about the predetermined trick play speed and one or more uniform resource locators (URLs) of the one or more segments divided and generated based on time to be played exclusively at the predetermined trick play speed.]

[4. The method of claim 1, wherein:

the MPD file comprises information about at least one of a frame rate, a frame type, and the maximum trick play speed;

the frame rate indicates a number of frames to be played per second by the client; and the frame type indicates whether the at least one piece of trick play data comprises only intra-frames, or intra- and inter-frames.]

[5. The method of claim 1, wherein:

the MPD file comprises information about trick play data corresponding to a predetermined trick play speed, which physically exists in the server, and information about at least one piece of trick play data corresponding to play speeds other than the predetermined trick play speed, which virtually exists in the server; and the method further comprises extracting the at least one piece of trick play data corresponding to the play speeds other than the predetermined trick play speed from the trick play data corresponding to the predetermined trick play speed in response to the request of the client based on the MPD file.]

[6. The method of claim 5, wherein the predetermined trick play speed is a 2× trick play speed.]

[7. The method of claim 5, wherein the extracting the at least one piece of trick play data corresponding to the play speeds other than the predetermined trick play speed comprises extracting the at least one piece of trick play data corresponding to the play speeds other than the predetermined trick play speed using a common gateway interface (CGI) program based on an index file comprising locations and sizes of frames.]

[8. The method of claim 5, wherein:

the MPD file further comprises information about at least one of a frame rate, a frame type, and a maximum trick play speed;

the frame rate indicates a number of frames to be played per second by the client; and the frame type indicates whether the at least one piece of trick play data comprises only intra-frames, or intra- and inter-frames.]

[9. The method of claim 1, wherein:

a number of the at least one piece of trick play data is determined based on a maximum depth of trick levels;

the at least one piece of trick play data comprises one or more segments generated by encoding media content at a predetermined bit rate into frames corresponding to a predetermined trick level and dividing the encoded frames based on time;

the predetermined trick level corresponds to a hierarchical structure and is one of at least one trick level based on the maximum depth of trick levels;

the maximum depth of trick levels is determined based on a maximum trick play speed; and the frames comprised in the predetermined trick level do not repeatedly exist in another trick level of the at least one trick level.]

[10. The method of claim 9, wherein:

the MPD file comprises information about the predetermined trick level and one or more URLs of the one or more segments divided and generated based on time and corresponding to the predetermined trick level; and the information about the predetermined trick level comprises information about at least one trick play speed using the one or more segments divided and generated based on time.]

[11. The method of claim 9, wherein:

the MPD file comprises information about at least one of a frame rate, a frame type, and the maximum trick play speed;

the frame rate indicates a number of frames to be played per second by the client; and the frame type indicates whether the at least one piece of trick play data comprises only intra-frames, or intra- and inter-frames.]

[12. The method of claim 1, wherein:

the at least one piece of trick play data comprises one or more segments generated by encoding media content at a predetermined bit rate into frames corresponding to a predetermined trick play speed and dividing the encoded frames based on time;

the MPD file comprises information about at least one of a frame rate, a frame type, and a maximum trick play speed;

the frame rate indicates a number of frames to be played per second by the client; and the frame type indicates whether the at least one piece of trick play data comprises only intra-frames, or intra- and inter-frames.]

[13. A method of providing a trick play service at a client, the method comprising:

receiving a media presentation description (MPD) file comprising information about at least one piece of trick play data; and receiving the at least one piece of trick play data from a server based on the MPD file, wherein a number of the at least one piece of trick play data is determined based on a maximum trick play speed; and the at least one piece of trick play data comprises one or more segments generated by encoding media content at a predetermined bit rate into frames corresponding to a predetermined trick play speed and dividing the encoded frames based on time.]

[14. The method of claim 13, wherein the MPD file comprises type information identifying that the at least one piece of trick play data is data for trick play.]

[15. The method of claim 1, wherein the MPD file comprises information about the predetermined trick play speed and one or more uniform resource locators (URLs) of the one or more segments divided and generated based on time and be played exclusively at the predetermined trick play speed.]

[16. The method of claim 1, wherein:

the MPD file comprises information about at least one of a frame rate, a frame type, and the maximum trick play speed;

wherein the frame rate indicates a number of frames to be played per second at the client; and the frame type indicates whether the at least one piece of trick play data comprises only intra-frames, or intra- and inter-frames.]

[17. The method of claim 13, wherein:

the MPD file comprises information about trick play data corresponding to a predetermined trick play speed, which physically exists in the server, and information about at least one piece of trick play data corresponding to play speeds other than the predetermined trick play speed, which virtually exists in the server; and the receiving the at least one piece of trick play data from the server comprises receiving, from the server, the at least one piece of trick play data corresponding to the play speeds other than the predetermined trick play speed, which is extracted by the server from the trick play data corresponding to the predetermined trick play speed in response to a request by the client based on the MPD file.]

[18. The method of claim 17, wherein the predetermined trick play speed is a 2× trick play speed.]

[19. The method of claim 17, wherein the at least one piece of trick play data corresponding to the play speeds other than the predetermined trick play speed is extracted by the server from the trick play data corresponding to the predetermined trick play speed trick play speed by using a common gateway interface (CGI) program based on an index file comprising locations and sizes of frames.]

[20. The method of claim 17, wherein:

the MPD file further comprises information about at least one of a frame rate, a frame type, and a maximum trick play speed:

the frame rate indicates a number of frames to be played per second by the client; and the frame type indicates whether the at least one piece of trick play data comprises only intra-frames, or intra- and inter-frames.]

[21. The method of claim 13, wherein:

a number of the at least one piece of trick play data is determined based on a maximum depth of trick levels;

the at least one piece of trick play data comprises one or more segments generated by encoding media content at a predetermined bit rate into frames corresponding to a predetermined trick level and dividing the encoded frames based on time;

the predetermined trick level corresponds to a hierarchical structure and is one of at least one trick level based on the maximum depth of trick levels;

the maximum depth of trick levels is determined based on a maximum trick play speed; and the frames comprised in the predetermined trick level do not repeatedly exist in another trick level of the at least one trick level.]

[22. The method of claim 21, wherein:

the MPD file comprises information about the predetermined trick level and one or more URLs of the one or more segments divided and generated based on time and corresponding to the predetermined trick level; and the information about the predetermined trick level comprises information about at least one trick play speed using the one or more segments divided and generated based on time.]

[23. The method of claim 22, wherein the receiving the at least one piece of trick play data from the server comprises receiving, from the server, the at least one piece of trick play data corresponding to each trick level in order to support a predetermined trick play speed based on a request by the client.]

[24. The method of claim 21, further comprising realigning the at least one piece of trick play data in an order of play time.]

[25. The method of claim 21, wherein:

the MPD file comprises information about at least one of a frame rate, a frame type, and the maximum trick play speed;

the frame rate indicates a number of frames to be played per second by the client; and the frame type indicates whether the at least one piece of trick play data comprises only intra-frames, or intra- and inter-frames.]

[26. The method of claim 13, wherein:

the at least one piece of trick play data comprises one or more segments generated by encoding media content at a predetermined bit rate into frames corresponding to a predetermined trick play speed and dividing the encoded frames based on time;

the MPD file comprises information about at least one of a frame rate, a frame type, and a maximum trick play speed;

the frame rate indicates a number of frames to be played per second by the client; and the frame type indicates whether the at least one piece of trick play data comprises only intra-frames, or intra- and inter-frames.]

[27. The method of claim 26, further comprising varying the frame rate into the number of frames per second corresponding to the predetermined trick play speed.]

[28. The method of claim 26, further comprising playing the at least one piece of trick play data based on the frame rate.]

[29. A server comprising:

an information generation unit which generates a media presentation description (MPD) file comprising information about at least one piece of trick play data;

an information transmission unit which transmits the MPD file to a client; and a trick play data transmission unit which transmits the at least one piece of trick play data to the client in response to a request by the client based on the MPD file, wherein a number of the at least one piece of trick play data is determined based on a maximum trick play speed; and the at least one piece of trick play data comprises one or more segments generated by encoding media content at a predetermined bit rate into frames corresponding to a predetermined trick play speed and dividing the encoded frames based on time.]

[30. A client comprising:

an information reception unit which receives a media presentation description (MPD) file comprising information about at least one piece of trick play data; and a trick play data reception unit which receives the at least one piece of trick play data from a server based on the MPD file, wherein a number of the at least one piece of trick play data is determined based on a maximum trick play speed; and the at least one piece of trick play data comprises one or more segments generated by encoding media content at a predetermined bit rate into frames corresponding to a predetermined trick play speed and dividing the encoded frames based on time.]

[31. A method of providing a trick play service at an encoder, the method comprising:

generating at least one piece of trick play data from a media content according to a predetermined generating method that corresponds to information comprised in a media presentation description (MPD) file that is transmitted to a client and based on which the client requests the at least one piece of trick play data, wherein a number of the at least one piece of trick play data is determined based on a maximum trick play speed; and the at least one piece of trick play data comprises one or more segments generated by encoding media content at a predetermined bit rate into frames corresponding to a predetermined trick play speed and dividing the encoded frames based on time.]

[32. A system comprising:

an encoder which generates at least one piece of trick play data from a media content; and a server which comprises:

an information generation unit which generates a media presentation description (MPD) file comprising information about the at least one piece of trick play data, an information transmission unit which transmits the MPD file to a client, and a trick play data transmission unit which transmits the at least one piece of trick play data to the client in response to a request by the client based on the MPD file, wherein a number of the at least one piece of trick play data is determined based on a maximum trick play speed; and the at least one piece of trick play data comprises one or more segments generated by encoding media content at a predetermined bit rate into frames corresponding to a predetermined trick play speed and dividing the encoded frames based on time.]

[33. The system of 32, further comprising the client which comprises:

an information reception unit which receives the MPD file comprising the information about the at least one piece of trick play data; and a trick play data reception unit which receives the at least one piece of trick play data from the server based on the MPD file. ]

[34. A non-transitory computer readable recording medium having recorded thereon a computer program for executing the method of claim 1.]

[35. A non-transitory computer readable recording medium having recorded thereon a computer program for executing the method of claim 13.]

[36. A non-transitory computer readable recording medium having recorded thereon a computer program for executing the method of claim 31.]

*37. A method of providing a trick play service at a server, the method comprising:*

*generating a media presentation description (MPD) file comprising information about a maximum trick play speed of at least one trick play data and information indicating that there is a frame that depends on one or more other frames for decoding;*

*transmitting the MPD file to a client; and*

*transmitting the at least one trick play data to the client in response to a request by the client based on the MPD file,*

*wherein the maximum trick play speed is indicated as a multiple of regular playout rate supported with the client,*

*a number of the at least one piece of trick play data is determined based on a maximum depth of trick levels,*

*the at least one piece of trick play data comprises one or more segments generated by encoding media content at a predetermined bit rate into frames corresponding to a predetermined trick level and dividing the encoded frames based on time,*

*the predetermined trick level corresponds to a hierarchical structure and is one of at least one trick level based on the maximum depth of trick levels,*

*the maximum depth of trick levels is determined based on the maximum trick play speed, and*

*the frames comprised in the predetermined trick level do not repeatedly exist in another trick level of the at least one trick level.*

*38. The method of claim 37, wherein the MPD file comprises type information identifying that the at least one piece of trick play data is data for trick play.*

*39. The method of claim 37, wherein:*

*a number of the at least one piece of trick play data is determined based on the maximum trick play speed; and*

*the at least one piece of trick play data comprises one or more segments generated by encoding media content at a predetermined bit rate into frames corresponding to a predetermined trick play speed and dividing the encoded frames based on time.*

*40. The method of claim 39, wherein the MPD file comprises information about the predetermined trick play speed and one or more uniform resource locators (URLs) of the one or more segments divided and generated based on time to be played exclusively at the predetermined trick play speed.*

*41. The method of claim 39, wherein:*

*the MPD file comprises information about at least one of a frame rate and the maximum trick play speed; and*

*the frame rate indicates a number of frames to be played per second by the client.*

*42. The method of claim 39, wherein:*

*the MPD file comprises information about trick play data corresponding to a predetermined trick play speed, which physically exists in the server, and information about at least one piece of trick play data corresponding to play speeds other than the predetermined trick play speed, which virtually exists in the server; and*

*the method further comprises extracting the at least one piece of trick play data corresponding to the play speeds other than the predetermined trick play speed from the trick play data corresponding to the predetermined trick play speed in response to the request of the client based on the MPD file.*

*43. The method of claim 42, wherein the predetermined trick play speed is a 2× trick play speed.*

*44. The method of claim 42, wherein the extracting the at least one piece of trick play data corresponding to the play speeds other than the predetermined trick play speed comprises extracting the at least one piece of trick play data corresponding to the play speeds other than the predetermined trick play speed using a common gateway interface (CGI) program based on an index file comprising locations and sizes of frames.*

*45. The method of claim 42, wherein:*

*the MPD file further comprises information about at least one of a frame rate, a frame type, and the maximum trick play speed;*

*the frame rate indicates a number of frames to be played per second by the client; and*

*the frame type indicates whether the at least one piece of trick play data comprises only intra-frames, or intra- and inter-frames.*

*46. The method of claim 37, wherein:*

*the MPD file comprises information about the predetermined trick level and one or more URLs of the one or more segments divided and generated based on time and corresponding to the predetermined trick level; and*

*the information about the predetermined trick level comprises information about at least one trick play speed using the one or more segments divided and generated based on time.*

*47. The method of claim 37, wherein:*

*the MPD file comprises information about at least one of a frame rate and the maximum trick play speed; and*

*the frame rate indicates a number of frames to be played per second by the client.*

*48. The method of claim 37, wherein:*

*the at least one piece of trick play data comprises one or more segments generated by encoding media content at a predetermined bit rate into frames corresponding to a predetermined trick play speed and dividing the encoded frames based on time;*

*the MPD file comprises information about at least one of a frame rate and the maximum trick play speed; and*

*the frame rate indicates a number of frames to be played per second by the client.*

*49. The method of claim 37, wherein the information indicates whether the at least one trick play data includes the frame that depends on one or more other frames for decoding and whether the at least one trick play data includes intra frames and does not include inter frames.*

*50. A method of providing a trick play service at a client, the method comprising:*

*receiving a media presentation description (MPD) file comprising information about a maximum trick play speed of at least one trick play data and information indicating that there is a frame that depends on one or more other frames for decoding; and*

*receiving the at least one trick play data from a server based on the MPD file,*

*wherein the maximum trick play speed is indicated as a multiple of regular playout rate supported with the client;*

*a number of the at least one piece of trick play data is determined based on a maximum depth of trick levels;*

*the at least one piece of trick play data comprises one or more segments generated by encoding media content at a predetermined bit rate into frames corresponding to a predetermined trick level and dividing the encoded frames based on time;*

*the predetermined trick level corresponds to a hierarchical structure and is one of at least one trick level based on the maximum depth of trick levels;*

*the maximum depth of trick levels is determined based on the maximum trick play speed; and*

*the frames comprised in the predetermined trick level do not repeatedly exist in another trick level of the at least one trick level.*

*51. The method of claim 50, wherein the MPD file comprises type information identifying that the at least one piece of trick play data is data for trick play.*

*52. The method of claim 50, wherein:*

*a number of the at least one piece of trick play data is determined based on the maximum trick play speed; and*

*the at least one piece of trick play data comprises one or more segments generated by encoding media content at a predetermined bit rate into frames corresponding to a predetermined trick play speed and dividing the encoded frames based on time.*

*53. The method of claim 52, wherein the MPD file comprises information about the predetermined trick play speed and one or more uniform resource locators (URLs) of the one or more segments divided and generated based on time and be played exclusively at the predetermined trick play speed.*

*54. The method of claim 52, wherein:*

*the MPD file comprises information about at least one of a frame rate and the maximum trick play speed; and*

*the frame rate indicates a number of frames to be played per second at the client.*

*55. The method of claim 50, wherein:*

*the MPD file comprises information about trick play data corresponding to a predetermined trick play speed, which physically exists in the server, and information about at least one piece of trick play data corresponding to play speeds other than the predetermined trick play speed, which virtually exists in the server; and*

*the receiving the at least one piece of trick play data from the server comprises receiving, from the server, the at least one piece of trick play data corresponding to the* play speeds other than the predetermined trick play speed, which is extracted by the server from the trick play data corresponding to the predetermined trick play speed in response to a request by the client based on the MPD file.

56. The method of claim 55, wherein the predetermined trick play speed is a 2× trick play speed.

57. The method of claim 55, wherein the at least one piece of trick play data corresponding to the play speeds other than the predetermined trick play speed is extracted by the server from the trick play data corresponding to the predetermined trick play speed trick play speed by using a common gateway interface (CGI) program based on an index file comprising locations and sizes of frames.

58. The method of claim 55, wherein:

the MPD file further comprises information about at least one of a frame rate and the maximum trick play speed; and the frame rate indicates a number of frames to be played per second by the client.

59. The method of claim 50, wherein:

the MPD file comprises information about the predetermined trick level and one or more URLs of the one or more segments divided and generated based on time and corresponding to the predetermined trick level; and the information about the predetermined trick level comprises information about at least one trick play speed using the one or more segments divided and generated based on time.

60. The method of claim 59, wherein the receiving the at least one piece of trick play data from the server comprises receiving, from the server, the at least one piece of trick play data corresponding to each trick level in order to support a predetermined trick play speed based on a request by the client.

61. The method of claim 50, further comprising realigning the at least one piece of trick play data in an order of play time.

62. The method of claim 50, wherein:

the MPD file comprises information about at least one of a frame rate and the maximum trick play speed; and the frame rate indicates a number of frames to be played per second by the client.

63. The method of claim 50, wherein:

the at least one piece of trick play data comprises one or more segments generated by encoding media content at a predetermined bit rate into frames corresponding to a predetermined trick play speed and dividing the encoded frames based on time;

the MPD file comprises information about at least one of a frame rate and the maximum trick play speed; and the frame rate indicates a number of frames to be played per second by the client.

64. The method of claim 63, further comprising varying the frame rate into the number of frames per second corresponding to the predetermined trick play speed.

65. The method of claim 63, further comprising playing the at least one piece of trick play data based on the frame rate.

66. A server comprising:

a memory storing instructions; and at least one processor configured to execute the instructions to:

generate a media presentation description (MPD) file comprising information about a maximum trick play speed of at least one trick play data and information indicating that there is a frame that depends on one or more other frames for decoding, transmit the MPD file to a client, and transmit the at least one piece of trick play data to the client in response to a request by the client based on the MPD file, wherein the maximum trick play speed is indicated as a multiple of regular playout rate supported with the client, a number of the at least one piece of trick play data is determined based on a maximum depth of trick levels, the at least one piece of trick play data comprises one or more segments generated by encoding media content at a predetermined bit rate into frames corresponding to a predetermined trick level and dividing the encoded frames based on time, the predetermined trick level corresponds to a hierarchical structure and is one of at least one trick level based on the maximum depth of trick levels, the maximum depth of trick levels is determined based on the maximum trick play speed, and the frames comprised in the predetermined trick level do not repeatedly exist in another trick level of the at least one trick level.

67. A client comprising:

a memory storing instructions; and at least one processor configured to execute the instructions to:

receive a media presentation description (MPD) file comprising information about a maximum trick play speed of at least one trick play data and information indicating that there is a frame that depends on one or more other frames for decoding, and to receive the at least one trick play data from a server based on the MPD file, wherein the maximum trick play speed is indicated as a multiple of regular playout rate supported with the client, a number of the at least one piece of trick play data is determined based on a maximum depth of trick levels, the at least one piece of trick play data comprises one or more segments generated by encoding media content at a predetermined bit rate into frames corresponding to a predetermined trick level and dividing the encoded frames based on time, the predetermined trick level corresponds to a hierarchical structure and is one of at least one trick level based on the maximum depth of trick levels, the maximum depth of trick levels is determined based on the maximum trick play speed, and the frames comprised in the predetermined trick level do not repeatedly exist in another trick level of the at least one trick level.

68. A method of providing a trick play service at an encoder, the method comprising:

generating at least one piece of trick play data from a media content according to a predetermined generating method that corresponds to information comprised in a media presentation description (MPD) that is transmitted to a client and based on which the client requests the at least one piece of trick play data, wherein the maximum trick play speed is indicated as a multiple of regular playout rate supported with the client, a number of the at least one piece of trick play data is determined based on a maximum depth of trick levels,

*the at least one piece of trick play data comprises one or more segments generated by encoding media content at a predetermined bit rate into frames corresponding to a predetermined trick level and dividing the encoded frames based on time,*

*the predetermined trick level corresponds to a hierarchical structure and is one of at least one trick level based on the maximum depth of trick levels,*

*the maximum depth of trick levels is determined based on the maximum trick play speed, and*

*the frames comprised in the predetermined trick level do not repeatedly exist in another trick level of the at least one trick level.*

*69. A system comprising:*

*an encoder which generates at least one piece of trick play data from a media content; and*

*a server which comprises:*

*at least one processor configured to generate a media presentation description (MPD) file comprising information about a maximum trick play speed of at least one trick play data and information indicating that there is a frame that depends on one or more other frames for decoding, to transmit the MPD file to a client, and to transmit the at least one piece of trick play data to the client in response to a request by the client based on the MPD file,*

*wherein the maximum trick play speed included in the MPD is indicated as a multiple of regular playout rate supported with the client,*

*a number of the at least one piece of trick play data is determined based on a maximum depth of trick levels,*

*the at least one piece of trick play data comprises one or more segments generated by encoding media content at a predetermined bit rate into frames corresponding to a predetermined trick level and dividing the encoded frames based on time,*

*the predetermined trick level corresponds to a hierarchical structure and is one of at least one trick level based on the maximum depth of trick levels,*

*the maximum depth of trick levels is determined based on the maximum trick play speed, and*

*the frames comprised in the predetermined trick level do not repeatedly exist in another trick level of the at least one trick level.*

*70. The system of claim 69, further comprising the client which comprises:*

*at least one processor configured to receive the MPD file comprising the information about the at least one piece of trick play data and*

*to receive the at least one piece of trick play data from the server based on the MPD file.*

*71. A non-transitory computer readable recording medium having recorded thereon a computer program for executing the method of claim 37.*

*72. A non-transitory computer readable recording medium having recorded thereon a computer program for executing the method of claim 50.*

*73. A non-transitory computer readable recording medium having recorded thereon a computer program for executing the method of claim 68.*

* * * * *